United States Patent
Zhao et al.

(10) Patent No.: US 9,513,768 B2
(45) Date of Patent: Dec. 6, 2016

(54) GENERATION OF DEPTH IMAGES BASED UPON LIGHT FALLOFF

(75) Inventors: Chunshui Zhao, Beijing (CN); Jing Yan, Beijing (CN); Jiawei Gu, Shanghai (CN); Feng-hsiung Hsu, Beijing (CN); Shaopeng Song, Guangdong (CN); Mingjie Wang, Guangdong (CN); Jie Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/490,457

(22) Filed: Jun. 7, 2012

(65) Prior Publication Data

US 2013/0229499 A1  Sep. 5, 2013

Related U.S. Application Data

(63) Continuation of application No. PCT/CN2012/071935, filed on Mar. 5, 2012.

(51) Int. Cl.
| | |
|---|---|
| H04N 5/33 | (2006.01) |
| H04N 13/04 | (2006.01) |
| G06F 3/0482 | (2013.01) |
| G06F 3/01 | (2006.01) |
| G06F 3/0485 | (2013.01) |

(Continued)

(52) U.S. Cl.
CPC ............ *G06F 3/0482* (2013.01); *G01B 11/24* (2013.01); *G06F 3/017* (2013.01); *G06F 3/0485* (2013.01); *G06K 9/00355* (2013.01); *G06T 7/0065* (2013.01); *G06T 2207/10016* (2013.01); *G06T 2207/10021* (2013.01);

(Continued)

(58) Field of Classification Search
CPC ............ G06T 2207/10016; G06T 2207/10021; G06T 2207/10048; G06T 2207/20221; G06T 2207/30196; G06T 7/0065
USPC .......................................................... 348/51
See application file for complete search history.

(56) References Cited

U.S. PATENT DOCUMENTS

| | | | |
|---|---|---|---|
| 6,148,113 A | 11/2000 | Wolverton et al. | |
| 6,162,183 A | 12/2000 | Hoover | |

(Continued)

FOREIGN PATENT DOCUMENTS

| | | |
|---|---|---|
| CN | 101674418 A | 3/2010 |
| EP | 1126412 A2 | 8/2001 |
| JP | 10177449 A | 6/1998 |

OTHER PUBLICATIONS

Denker, et al., "Accurate Real-Time Multi-Camera Stereo Matching on the GPU for 3D Reconstruction", Retrieved at <<http://www-umlauf.informatik.uni-kl.de/~denker/publications/pdf/wscg11.pdf>>, Jan. 5, 2011, pp. 1-8.

(Continued)

*Primary Examiner* — Christopher S Kelley
*Assistant Examiner* — Asmamaw G Tarko
(74) *Attorney, Agent, or Firm* — Sandy Swain; Micky Minhas

(57) ABSTRACT

Technologies pertaining to computing depth images of a scene that includes a mobile object based upon the principle of light falloff are described herein. An infrared image of a scene that includes a mobile object is captured, wherein the infrared image has a plurality of pixels having a respective plurality of intensity values. A depth image for the scene is computed based at least in part upon square roots of respective intensity values in the infrared image.

20 Claims, 15 Drawing Sheets

(51) Int. Cl.
  *G06T 7/00* (2006.01)
  *G01B 11/24* (2006.01)
  *G06K 9/00* (2006.01)
  *H04N 13/02* (2006.01)

(52) U.S. Cl.
  CPC ............... *G06T 2207/10048* (2013.01); *G06T 2207/20221* (2013.01); *G06T 2207/30196* (2013.01); *H04N 13/0253* (2013.01)

(56) References Cited

U.S. PATENT DOCUMENTS

| | | | |
|---|---|---|---|
| 7,366,325 B2* | 4/2008 | Fujimura et al. | 382/104 |
| 8,594,425 B2* | 11/2013 | Gurman et al. | 382/173 |
| 2004/0146615 A1 | 7/2004 | McDonald et al. | |
| 2005/0275635 A1* | 12/2005 | Dehlin et al. | 345/173 |
| 2006/0097176 A1* | 5/2006 | Szu | 250/370.08 |
| 2007/0066323 A1* | 3/2007 | Park et al. | 455/456.2 |
| 2008/0285056 A1 | 11/2008 | Blayvas et al. | |
| 2010/0231512 A1* | 9/2010 | Perez et al. | 345/158 |
| 2010/0281438 A1* | 11/2010 | Latta et al. | 715/863 |
| 2011/0059798 A1* | 3/2011 | Pryor | 463/37 |
| 2011/0123183 A1* | 5/2011 | Adelsberger et al. | 396/164 |
| 2011/0205340 A1* | 8/2011 | Garcia et al. | 348/46 |
| 2011/0211754 A1* | 9/2011 | Litvak et al. | 382/165 |
| 2012/0039525 A1 | 2/2012 | Tian et al. | |
| 2012/0050157 A1* | 3/2012 | Latta et al. | 345/156 |
| 2012/0056982 A1* | 3/2012 | Katz et al. | 348/43 |
| 2012/0229611 A1* | 9/2012 | Pellman et al. | 348/49 |
| 2013/0016900 A1* | 1/2013 | Kim et al. | 382/162 |
| 2013/0229396 A1* | 9/2013 | Huebner | 345/207 |
| 2013/0249786 A1* | 9/2013 | Wang | 345/156 |
| 2013/0265220 A1* | 10/2013 | Fleischmann et al. | 345/156 |

OTHER PUBLICATIONS

"Microsoft Kinect", Retrieved at <<http://www.roborealm.com/help/Microsoft_Kinect.php>>, Mar. 22, 2012, pp. 1-7.
Van Den Bergh, et al., "Combining RGB and ToF Cameras for Real-Time 3D Hand Gesture Interaction", Retrieved at <<http://ieeexplore.ieee.org/stamp/stamp.jsp?tp=&arnumber=5711485>>, IEEE Workshop on Applications of Computer Vision (WACV), 2011, pp. 66-72.
Izadi, et al., "Kinect-Fusion: Real-time 3D Reconstruction and Interaction Using a Moving Depth Camera", Retrieved at <<http://research.microsoft.com/pubs/155416/kinectfusion-uist-comp.pdf>>, UIST, Oct. 16, 2011, pp. 1-10.
Ukida, "3D Depth Measurement by Phase Shifting Method Using Multiple Projection and Omni-Directional Cameras", Retrieved at <<http://ieeexplore.ieee.org/stamp/stamp.jsp?tp=&arnumber=5334741>>, ICCAS-SICE, Aug. 18, 2009, pp. 3619-3624.
"Supplementary Search Report Issued in European Patent Application No. 12870362.6", Mailed Date: Apr. 8, 2015, 3 Pages.
"Office Action Issued in European Patent Application No. 12870362.6", Mailed Date: Apr. 23, 2015, 6 Pages.
"Office Action for European Patent Application No. 12870362.6", Mailed Date: Aug. 6, 2015, 6 Pages.
"Office Action for Chinese Patent Application No. 201280071139.4", Mailed Date: Mar. 18, 2016, 16 Pages.
"Office Action Issued in Japanese Patent Application No. 2014-560210", Mailed Date: Mar. 8, 2016, 8 Pages.
Shinya, Maruyama, "Consideration of Correction Methods of Stereo Measurement by Range Images", In Proceedings of the 51st Annual Conference of the Institute of Systems, Control and Information Engineers, May 16, 2007, pp. 489-490.
"Office Action Issued in Chinese Patent Application No. 201280071139.4", Mailed Date: Jul. 25, 2016, 16 Pages.
Office Action Issued in Japanese Patent Application No. 2014-560210, Mailed Date: Jul. 12, 2016, 6 Pages.

* cited by examiner

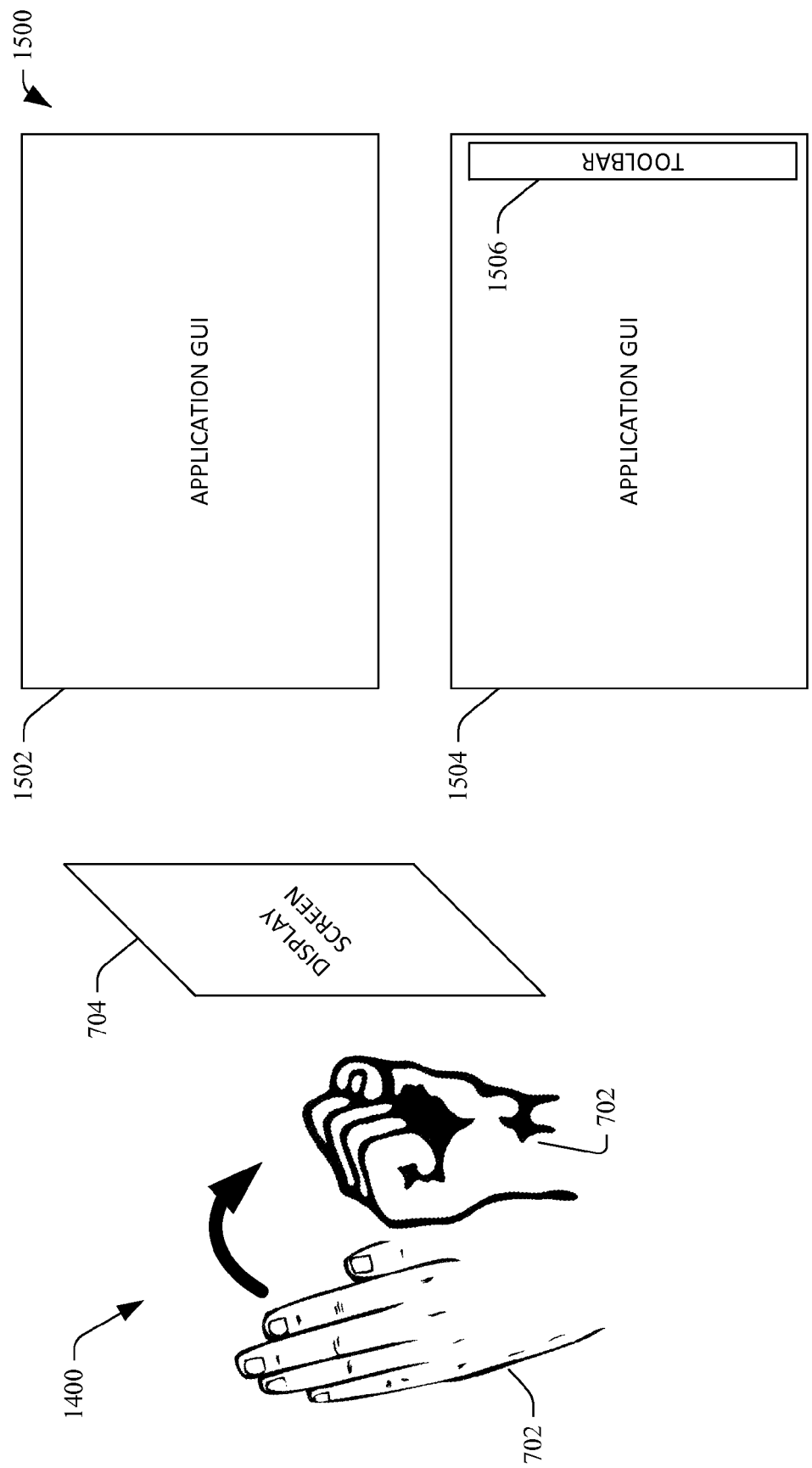

GENERATION OF DEPTH IMAGES BASED UPON LIGHT FALLOFF

RELATED APPLICATION

This application is a continuation of International Application No. PCT/CN2012/071935, filed on Mar. 5, 2012 in the State Intellectual Property Office of the People's Republic of China, and entitled "GENERATION OF DEPTH IMAGES BASED UPON LIGHT FALLOFF". The entirety of this application is incorporated herein by reference.

BACKGROUND

Manufacturers of computing devices as well as developers of operating systems that execute on such computing devices are continuously improving their respective products to facilitate intuitive and convenient user interaction with such computing devices, operating systems, and applications that execute thereon. Conventionally, input devices, such as a keyboard and mouse, have been employed to receive input from a user, wherein the input is utilized to perform some computing operation. Accordingly, if the user wishes for the computing device, the operating system, and/or an application to perform a certain task, the user transmits instructions to the computing device by a series of mouse clicks, movements of the mouse, and/or keystrokes.

Recently, consumer-level computing devices have been equipped with technologies that facilitate more intuitive and convenient interaction therewith when compared to the aforementioned conventional user input devices. For example, many mobile telephones are equipped with touch-sensitive display screens, such that the user can interact with a graphical object on the display screen by way of contacting the display screen with one or more fingers and performing a gesture therewith relative to the graphical object. It can be readily ascertained, however, that gestures that can be recognized by a touch-sensitive display can be somewhat limited, as conventional touch-sensitive display screens do not support finger/hand disambiguation, and do not support depth recognition. Further, as a user must interact directly with the display screen, gestures are limited by the size of the display screen.

Recognizing gestures made by a user in three-dimensional space can expand an instruction set that can be set forth by a user to a computing device through such gestures. Conventional technologies for recognizing depth of an object (a human hand) relative to a reference point or plane (a particular point on a computing device or a display screen) is either too expensive to be practically deployed for mass production or lacks sufficient resolution to support recognition of relatively granular gestures. For example, types of technologies currently employed to perform three-dimensional depth recognition include binocular vision systems, structured light systems, and time of flight systems. Binocular vision systems compute depth of a point on an object by matching images from stereoscopically arranged RGB cameras. A deficiency commonly associated with binocular vision systems is the requirement that an object whose depth from a reference point is desirably ascertained must have a particular type of texture. Further, the resolution of a resultant depth image may be insufficient to allow for sufficiently accurate recognition of a granular gesture, such as slight motion of a finger.

Structured light systems use an infrared light source that irradiates a scene with patterns of infrared light, and depth of an object in the scene relative to the infrared light source is computed based upon deformations detected in such patterns in a captured infrared image. When generating a depth image, numerous pixels in the captured infrared image must be analyzed to recognize the pattern—thus, again, resolution of a resultant depth image may be insufficient to accurately recognize certain gestures. Time of flight systems include sensors that measure an amount of time between when infrared light is transmitted from an infrared emitter to when such light is received by a detector (after reflecting off an object in a scene). Such systems are currently prohibitively expensive to include in consumer-level devices; if less expensive sensors are employed, resultant depth images again may lack sufficient resolution to allow for accurate detection of granular gestures.

SUMMARY

The following is a brief summary of subject matter that is described in greater detail herein. This summary is not intended to be limiting as to the scope of the claims.

Described herein are various technologies pertaining to generating depth images that indicate depths of portions of an object relative to a reference point or plane over time. More specifically, described herein are various technologies that generate depth images for a scene based upon the principle of light falloff. In an exemplary embodiment, gestures made by a human hand, arm, or other portion of the human body can be recognized through utilization of depth sensing technologies that employ the principle of light falloff to generate depth images that are representative of distance of the human hand, arm, or other portion of the human body relative to a sensor unit. Such gesture recognition technologies can be employed in connection with a conventional desktop computing device, a laptop computing device, a mobile telephone, a tablet computing device, or the like.

In an exemplary embodiment, a sensor unit that is employed in connection with generating depth images for a scene includes an infrared light source that irradiates a scene with infrared light. The sensor unit further includes an infrared camera that captures infrared images of the scene, wherein the scene includes a mobile object, such as a human hand or human hands. For example, the infrared camera can be an infrared video camera that captures images at a frame rate at or above 30 frames per second. Thus, the infrared camera can capture motion of the object in the scene over time. Each image captured by the infrared camera comprises a plurality of pixels having a respective plurality of intensity values. The intensity value for each pixel can be employed to compute a depth value for the portion of the scene represented by the pixel. Accordingly, if desired, a depth image of the scene can have a resolution that is equivalent to the resolution of the image captured by the infrared camera.

As mentioned above, depth images can be computed through employment of the principle of light falloff (where intensity of the infrared light captured in an infrared image is based upon the inverse square of the distance from the infrared light source). Accordingly, in an exemplary embodiment, a depth value corresponding to a particular pixel in an image can be computed based upon the intensity value of the pixel and a constant, wherein the constant is based upon the intensity of the infrared light emitted by the infrared light source, the reflectance of a portion of the object represented by the pixel, and orientation of the portion of the object represented by the pixel relative to the infrared light source. In an exemplary embodiment, the constant can be set based upon known intensity of the infrared light source, known reflectivity of a typical human hand, and average orientation of the human hand relative to the infrared light source (potentially depending upon location of the human hand in the captured infrared image) Further, the constant can be refined through empirical tests.

In another exemplary embodiment, conventional depth sensing systems can be employed to generate a first depth image of a scene at a first resolution. Subsequently, a second depth image of the scene is generated at a second resolution, wherein the second resolution is higher than the first resolution. The second depth image of the scene can be generated based upon the first depth image and the principle of light falloff. The procedure can be repeated to generate a plurality of high resolution depth images of the scene over time.

High resolution depth images can be monitored over time to perform motion capture and gesture recognition relative to one or more graphical objects displayed on a display screen of a computing device. Exemplary gestures made by a human hand that can be recognized based upon a sequence of depth images include, but are not limited to, an upward pivoting of the hand about the wrist (an upward wave), a leftward or rightward pivoting of the hand about the wrist when the fingers of the hand are extended and the palm of the hand is parallel with the surface of the display screen (a leftward or rightward wave), the extension of a pointer finger and movement of the pointer finger toward a graphical object displayed on the display screen, the pinching of the pointer finger and thumb together and the release of such pinching, leftward or rightward pivoting of the hand about the wrist when the fingers of the hand are extended orthogonal to the surface of the display screen and the palm of the hand is parallel with the bottom of the display screen, amongst other gestures. In an exemplary embodiment, a hand (or other body) gesture that can be recognized can be performed at least one centimeter away from the display screen of the computing device (or the infrared camera) and as far as 20 centimeters away from the display screen of the computing device (or the infrared camera). In other embodiments, the intensity of the infrared light source can be increased to detect gestures made by the user when the user is positioned several feet from the sensor unit.

Other aspects will be appreciated upon reading and understanding the attached figures and description.

BRIEF DESCRIPTION OF THE DRAWINGS

FIG. 14 illustrates another exemplary gesture undertaken relative to one or more graphical objects displayed on a display screen of a computing device.

FIG. 15 illustrates a sequence of graphical user interfaces presented to a user in connection with the exemplary gesture shown in FIG. 14.

DETAILED DESCRIPTION

Figure 1:
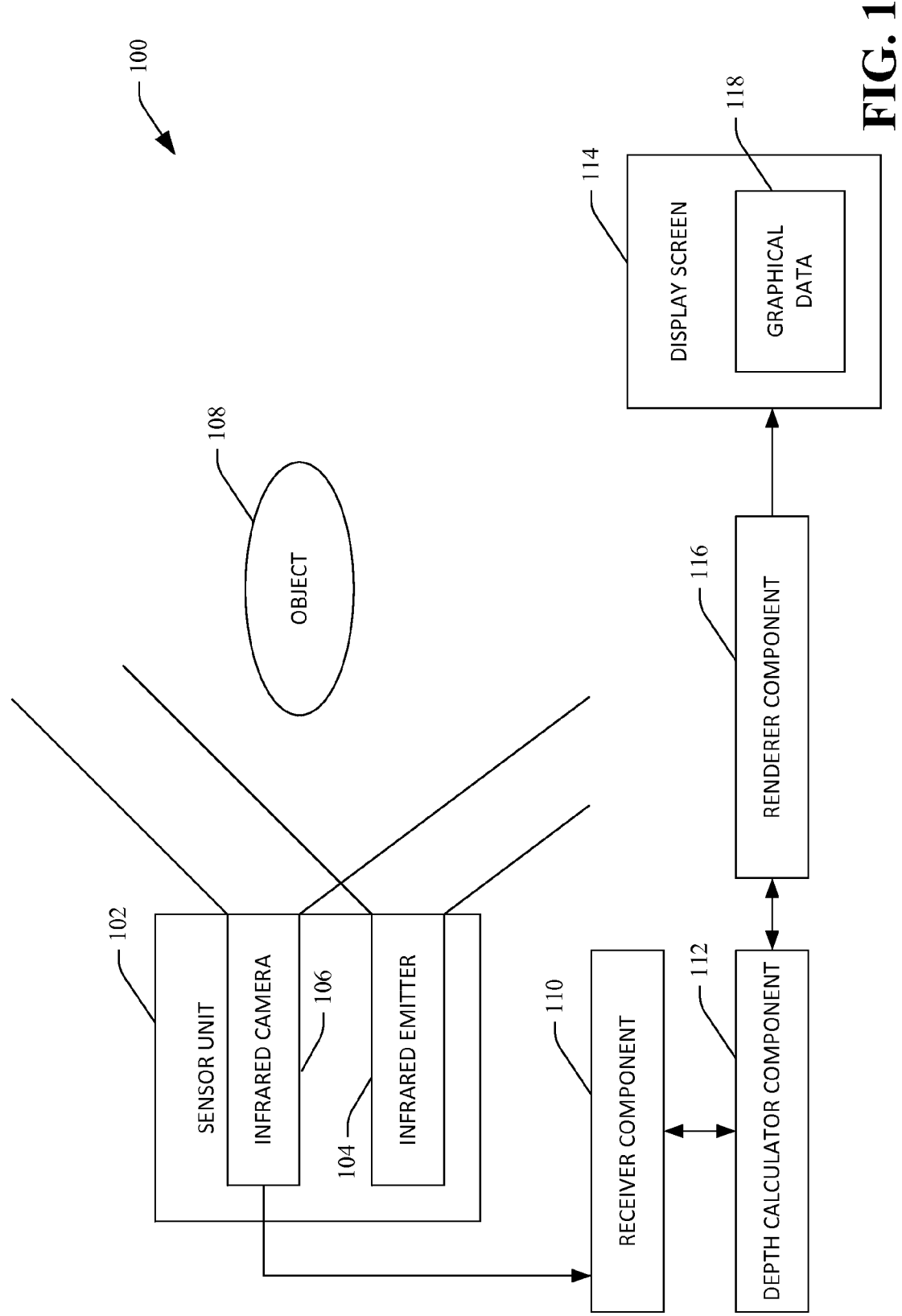
FIG. 1 is a functional block diagram of an exemplary system that facilitates generating a depth image of a scene.

Various technologies pertaining to generating depth images of a scene, recognizing gestures made in three-dimensional space in the scene, and rendering graphical data on a display screen of a computing device based upon recognized gestures will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. Accordingly, a "component" is intended to encompass a combination of hardware and software. The computer-executable instructions may include a routine, a function, or the like. It is also to be understood that a component or system may be localized on a single device or distributed across several devices. Further, the terms "memory" and "processor" are intended to encompass both the singular and the plural forms; accordingly, a processor is intended to encompass a single processor that executes instructions as well as a plurality of processors that execute instructions serially or in parallel.

With reference now to FIG. 1, an exemplary system 100 that facilitates generating depth images of a scene that includes at least one object is illustrated. In an exemplary embodiment, a mobile computing device can comprise at least a portion of the system 100, wherein the mobile computing device may be a mobile telephone, a tablet computing device, a laptop computing device, or the like. In another exemplary embodiment, a desktop computing device can comprise at least a portion of the system 100. Thus, a housing may comprise at least a portion of the system 100.

The system 100 comprises a sensor unit 102 that includes an infrared emitter 104 and an infrared camera 106. The infrared emitter 104 is configured to irradiate a scene with infrared light of a known intensity/frequency. The infrared camera 106 captures images of the scene irradiated by infrared light output by the infrared emitter 104. Pursuant to an example, the infrared camera 106 can capture images at video rate (e.g., 30 frames per second or higher). In another example, the infrared camera 106 can capture images at a rate between 10 frames per second and 30 frames per second. As shown, the scene imaged by the infrared camera 106 may include an object 108, wherein the object 108 is a mobile object. In an exemplary embodiment, the object 108 is one of a human hand or set of hands, a human arm, a human leg, or other suitable body part. Each image of the scene generated and output by the infrared camera 106 has a plurality of pixels that have a plurality of respective intensity values.

The system 100 further comprises a receiver component 110 that receives a sequence of infrared images of the scene from the infrared camera 106 over time. A depth calculator component 112 is in communication with the receiver component 110, and computes depth images of the scene for respective images captured by the infrared camera 106. The depth images computed by the depth calculator component 112 comprise a plurality of pixels and respective depth values, wherein a subset of the depth values are indicative of depths of portions of the object 108 relative to the infrared emitter 104. In an exemplary embodiment, the depth calculator component 112 can employ the principle of light falloff to compute the depth images of the scene, wherein a resolution of a depth image is equivalent to a resolution of the infrared image utilized by the depth calculator component to compute the depth image.

The system 100 further comprises a display screen 114 of a computing device. A renderer component 116 receives a depth image computed by the depth calculator component 112 and renders graphical data 118 on the display screen 114 based at least in part upon the depth image computed by the depth calculator component 112. As noted above, in an exemplary embodiment, the object 108 may be a human hand that is making a gesture relative to a graphical object displayed on the display screen 114. The depth calculator component 112 can generate a sequence of depth images that include the human hand, and the gesture made by the human hand can be recognized by analyzing the sequence of depth images. The renderer component 116 can then generate the graphical data 118 based at least in part upon the recognized gesture. The gesture can be made in three-dimensional space, and can be undertaken at a distance from the display screen 114 or the sensor unit 102. For instance, the human hand may be between 1 centimeter and 20 centimeters from the display screen 114 or the sensor unit 102. In another example, the human hand may be 5 centimeters to 20 centimeters from the display screen 114 or the sensor unit 102. In still yet another example, the human hand may be one meter to 5 meters from the display screen 114 or the sensor unit 102. Therefore, it can be ascertained that the display screen 114 need not be a touch sensitive display screen.

As noted above, the depth calculator component 112 can employ the principle of light falloff to generate depth images. The principle of light falloff notes that the intensity of light observed by a detector (the infrared camera 106) is proportional to the inverse square of the distance from the light source (the infrared emitter 104). Algorithmically, and with reference to an infrared image captured by the infrared camera 106, this principle can be represented as follows:

$$I(p) = \frac{k_p}{r_p^2}, \qquad (1)$$

where I(p) is the intensity value of pixel p, $r_p$ is a distance between the infrared emitter 104 and a point on the object 108 represented by pixel p, and $k_p$ is a constant that is related to an intensity of infrared light emitted by the infrared emitter 104, the reflectance of the object 108 at the point represented by pixel p, and an orientation of the object 108 at the point represented by the pixel p. Specifically, $k_p$=L(θ)ρ(θ, φ), where L(θ) is radiance of infrared light along incident direction θ, ρ(θ, φ) is a bidirectional reflectance distribution function of the point on the object represented by pixel p, and φ is an orientation of the point on the object represented by pixel p relative to the infrared emitter 104.

Solved for $r_p$, Eq. (1) can be rewritten as follows:

$$r_p = \frac{\sqrt{k_p}}{\sqrt{I_{(p)}}}. \qquad (2)$$

Accordingly, the depth calculator component 112 can compute a depth of the scene image based at least in part upon the square root of intensity values of pixels in an infrared image captured by the infrared camera 106. Pursuant to an example, a value for $k_p$ can be determined empirically. For instance, the intensity of infrared light emitted by the infrared emitter 104 can be known, and values of reflectance of the object 108 can be estimated. In an example, if it is desirable to detect depth values corresponding to a human hand, reflectivity of a typical human hand can be ascertained and utilized when selecting a value for $k_p$.

Figure 2:
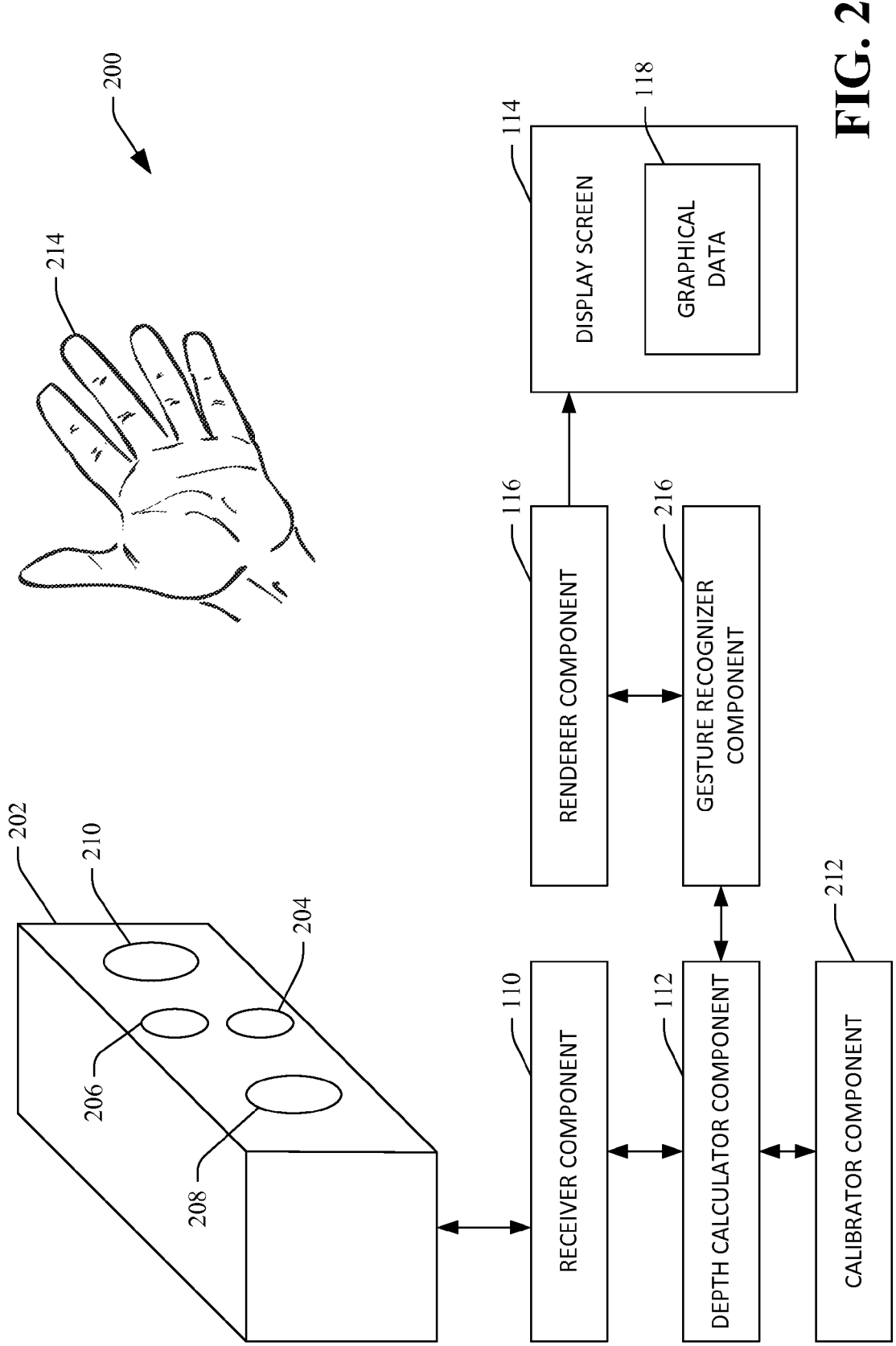
FIGS. 2 and 3 are functional block diagrams of exemplary systems that facilitate recognizing a gesture performed by a human hand in three-dimensional space.

Now referring to FIG. 2, an exemplary system 200 that facilitates recognizing gestures made by a human hand is illustrated. The system 200 comprises a sensor unit 202, wherein the sensor unit 202 comprises an infrared emitter 204, an infrared camera 206, a first RGB camera 208, and a second RGB camera 210. The first RGB camera 208 and the second RGB camera 210 are displaced relative to one another, such as to capture images of a scene in stereo. The infrared camera 206, the first RGB camera 208, and the second RGB camera 210 are synchronized with one another in time.

In a calibration phase, the first RGB camera 208 and the second RGB camera 210 capture respective synchronized images of a scene that comprises an object with a known pattern. The receiver component 110 receives the images, and the depth calculator component 112 computes a first depth image based upon the RGB images by way of conventional stereoscopic depth sensing operations. The infrared camera 206 captures an image of the scene (synchronized with the RGB images), and the depth calculator component 112 generates a second depth image utilizing the principle of light falloff, as has been described above.

The system 200 further comprises a calibrator component 212 that learns calibration parameters between depth images generated via stereoscopic analysis of RGB images and depth images generated based upon the principle of light falloff. The calibration parameters are indicative of mappings between pixels in respective depth images generated by the two different techniques.

Subsequent to the calibrator component 212 learning the calibration parameters, the sensor unit 202 can be employed to capture images of a scene that includes a human hand 214. The receiver component 110 receives synchronized images from the first RGB camera 208, the second RGB camera 210, and the infrared camera 206. The depth calculator component 112 is in communication with the receiver component 110 and computes a first depth image of the scene (at a first resolution) based upon the RGB images captured by the first RGB camera 208 and the second RGB camera 210, respectively. The depth calculator component 112 can compute this first depth image through conventional binocular vision techniques. This first depth image can then be segmented into a plurality of segments based upon depth values, such that a first segment comprises pixels having depth values in a first range, a second segment comprises pixels having depth values in a non-overlapping second range, and so on. Ranges employed to segment the first depth image can be empirically determined.

Using the calibration parameters learn by the calibrator component 212 during the calibration phase, the plurality of segments (with known depths corresponding thereto) from the first depth image can be mapped to corresponding pixels in the infrared image generated by the infrared camera 206. For each segment mapped to the infrared image, a pixel in the infrared image in the mapped segment is selected. The pixel can be selected through any suitable technique, including random selection, through computing a centroid of the segment and selecting the pixel at the centroid, etc. Utilizing the intensity value I(p) of the selected pixel and the distance $r_p$ for the segment that is mapped to such pixel, the constant $k_p$ can be computed. The value of $k_p$ is then employed to compute $r_p$ for each pixel p in the segment. This can be undertaken for every segment. The resultant depth image, which is based upon a combination of binocular vision technologies and the principle of light falloff, thus has a resolution that is equivalent to the resolution of the infrared image (and typically higher than the depth images generated based upon binocular vision techniques).

The depth calculator component 112 computes high resolution depth images for each infrared image captured by the infrared camera 206, such that a sequence of depth images can be analyzed to capture motion of the human hand 214 and/or recognize gestures made by the human hand 214. To that end, the system 200 further comprises a gesture recognizer component 216 that receives a sequence of depth images from the depth calculator component 112 and recognizes a gesture made by the human hand 214 relative to at least one graphical object being displayed on the display screen 114. The gesture recognizer component 216 outputs a signal to the renderer component 116 that identifies that a gesture has been undertaken relative to at least one graphical object, and the renderer component 116 renders the graphical data 118 on the display screen 114 based at least in part upon the gesture of the human hand 214 recognized by the gesture recognizer component 216.

The gesture recognizer component 216 can recognize a relatively large number of gestures that can be made by a user. This is at least partially because gestures made by the user are not limited to the surface area of the display screen 114. Further, since the depth calculator component 112 generates relatively high resolution depth images, the gesture recognizer component 216 can disambiguate between fingers and hands of the user, thereby expanding a potential set of gestures that can be recognized. Therefore, for instance, a gesture made by the left hand of the user may have a first desired outcome, while a similar gesture made by the right hand of the user may have a second (different) desired outcome. The gesture recognizer component 216 can disambiguate between hands, fingers, and users, thereby allowing the creation of customized gestures for a particular user as well as a relatively large gesture vocabulary.

Figure 3:
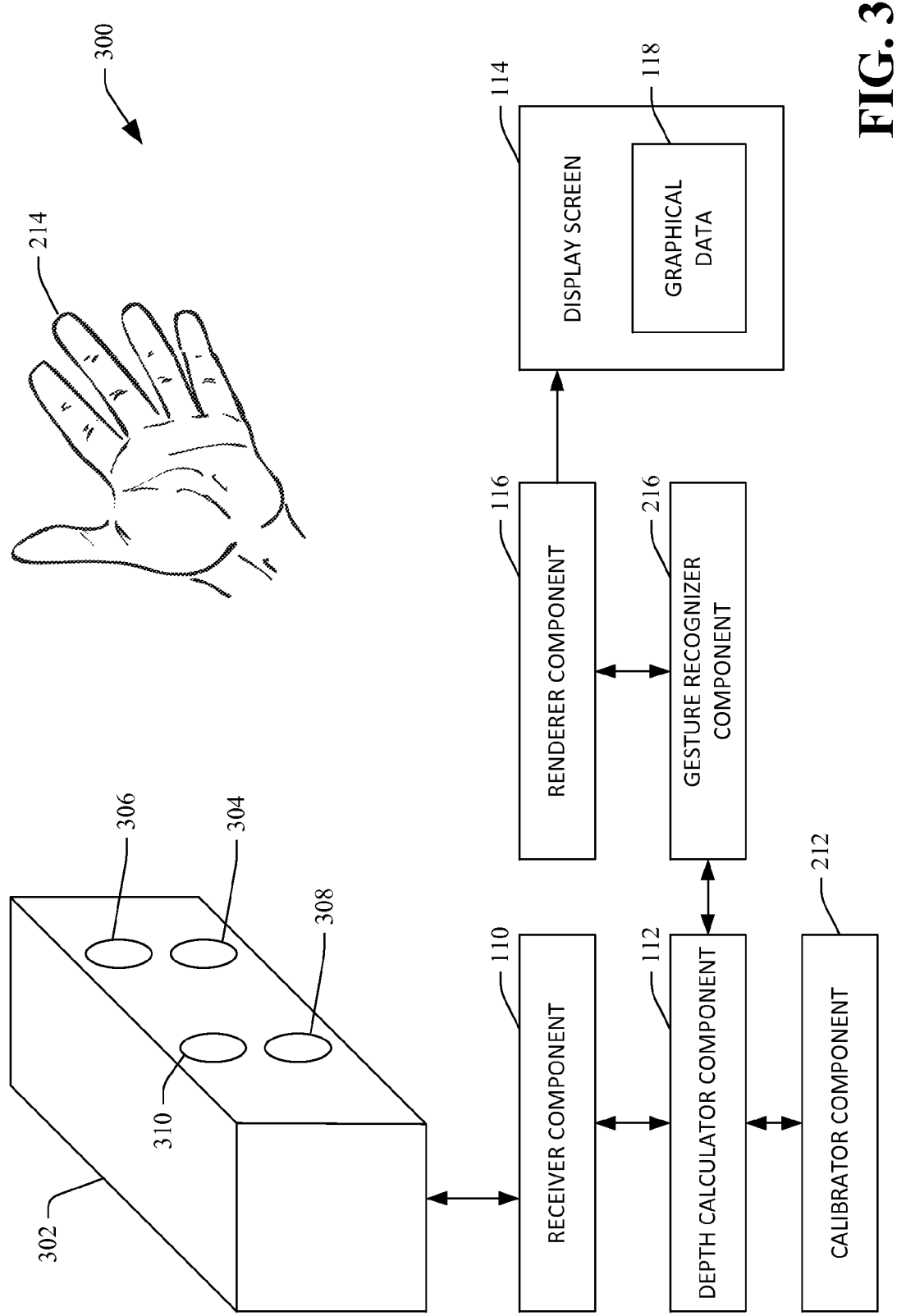

With reference now to FIG. 3, an exemplary system 300 that facilitates recognizing a gesture made by a human relative to a graphical object displayed on the display screen 114 is illustrated. The system 300 comprises a sensor unit 302, wherein the sensor unit 302 comprises a first infrared emitter 304, a corresponding first infrared camera 306, a second infrared emitter 308, and a corresponding second infrared camera 310. The first infrared emitter 304 is configured to emit infrared light at a first frequency and the first infrared camera 306 is configured to detect infrared light of the first frequency. Similarly, the second infrared emitter 308 is configured to emit infrared light at a second frequency and the second infrared camera 310 is configured to detect infrared light at the second frequency. The first infrared camera 306 and the second infrared camera 310 are synchronized with one another in time. Further, the first infrared emitter 304 outputs certain patterns of infrared light.

In a calibration phase, the receiver component 110 receives an image captured by the first infrared camera 306, and the depth calculator component 112 computes a first depth image by way of conventional structured light techniques. The receiver component 110 also receives an image captured by the second infrared camera 310, and the depth calculator component 112 computes a second depth image based upon the principle of light falloff, as described above. The calibrator component 212 learns calibration parameters that map pixels in the first depth image to pixels in the second depth image. Such calibration parameters can subsequently be employed to map depth images generated based upon structured light techniques to infrared images captured by the second infrared camera 310 (as resolution of images generated by the second infrared camera 310 is equivalent to resolution of the aforementioned second depth image).

Subsequent to the calibration parameters being learned, the system 300 can be deployed to recognize human gestures (e.g., gestures made by the human hand 214 relative to a graphical object on the display screen 114). In operation, the first infrared camera 306 and the second infrared camera 310 capture respective infrared images of a scene that includes the human hand. The receiver component 110 receives these images, and the depth calculator component generates a depth image based upon the image captured by the first infrared camera 306 using conventional structured light techniques. As will be understood by one skilled in the art, the depth image will have a resolution that is lower than the resolution of the image captured by the first infrared camera 306. The depth calculator component 112 can then segment the depth image into a plurality of segments (similarly to the segmentation described with respect to FIG. 2). The depth calculator component 112 can map segments to the infrared image output by the second infrared camera 310 using the calibration parameters learn by the calibration component 212. The depth calculator component 112 may then act as described above with respect to FIG. 2 to generate a high resolution depth image by computing $k_p$ for each segment.

The gesture recognizer component 216 receives a sequence of high resolution depth images of the scene from the depth calculator component 112, and recognizes a gesture being performed by the human hand 214 relative to the graphical object displayed on the display screen 114. The renderer component 116 then renders the graphical data 118 on the display screen 114 based upon the gesture recognized by the gesture recognizer component 216.

It can therefore be ascertained that depth sensing based upon the principle of light falloff can be used in combination with conventional depth sensing technologies to generate high resolution depth images of a scene for utilization in connection with motion capture and/or gesture recognition. While binocular vision technologies and structured light technologies have been described herein as being combinable with light falloff technologies, it is to be understood that other depth sensing technologies can be combined with depth sensing based upon the principle of light falloff. For instance, a time of flight depth sensing system can be employed in combination with the light falloff technologies described above.

Figure 4:
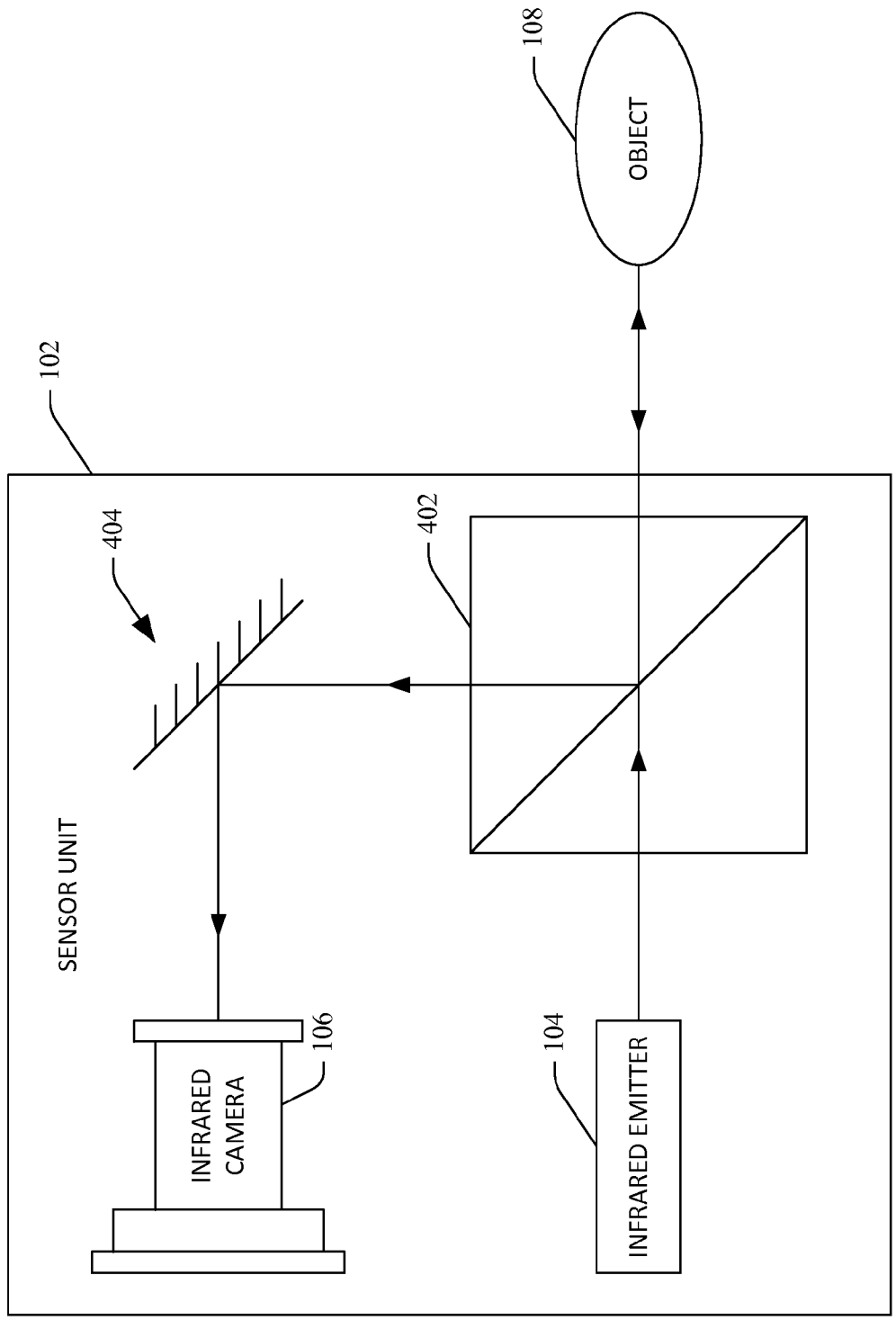
FIG. 4 is a functional block diagram of an exemplary sensor unit.

Referring now to FIG. 4, an exemplary depiction of the sensor unit 102 is shown. The sensor unit 102 comprises the infrared emitter 104 and the infrared camera 106. The infrared emitter 104 is a point source emitter that outputs infrared light. The sensor unit 102 further comprises a beam splitter 402 that splits infrared light emitted by the infrared emitter 104 into two beams: a first beam to irradiate a scene that includes the object 108 with infrared light; and a second beam that is employed for amplification purposes. Infrared light reflected from the scene (e.g., from the object 108) impacts the beam splitter 402 and is combined with the second beam, thereby generating an amplified signal. The sensor unit 102 also includes a mirror 404, which directs the amplified signal to the infrared camera 106. The sensor unit 102 as shown in FIG. 4 is an exemplary configuration; other configurations are contemplated and are intended to fall within the scope of the hereto-appended claims.

Figure 5:
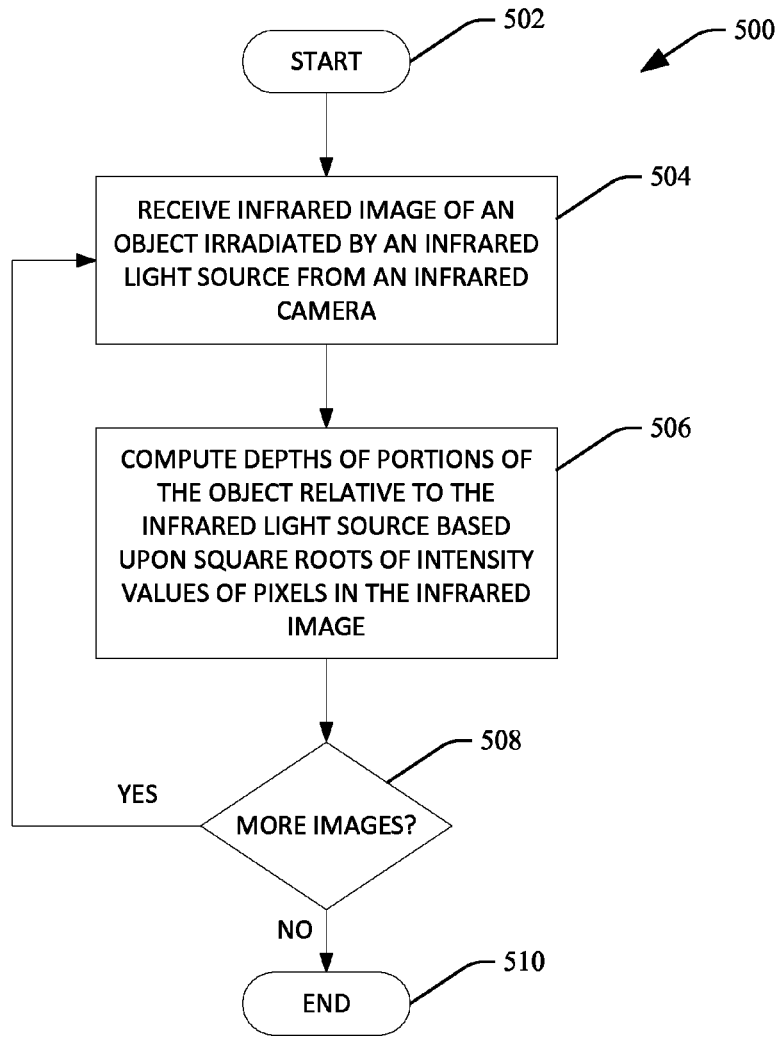
FIG. 5 is a flow diagram that illustrates an exemplary methodology for generating a depth image of a scene through utilization of the principle of light falloff.
Figure 6:
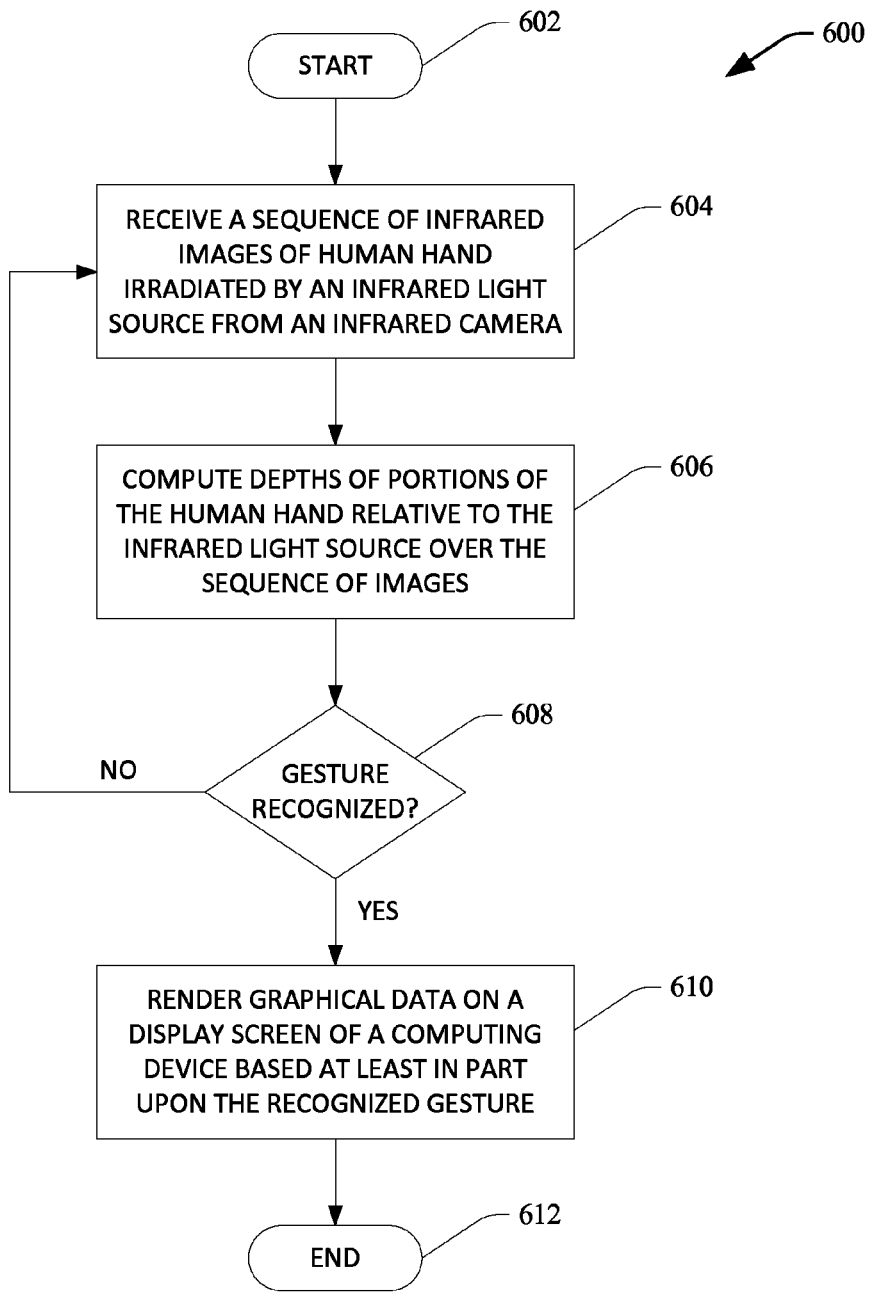
FIG. 6 is a flow diagram that illustrates an exemplary methodology for rendering graphical data on a display screen of a computing device based at least in part upon a recognized gesture.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring solely to FIG. 5, an exemplary methodology 500 that facilitates computing a depth image based upon the principle of light falloff is illustrated. The methodology 500 starts at 502, and at 504 an infrared image of a scene that is irradiated with infrared light from an infrared light source is received from an infrared camera. The scene includes a mobile object, such as a human finger, hand, or the like.

At 506, depths, relative to the infrared light source, of points of the object are computed based upon square roots of respective intensities of pixels that represent the respective points of the object. At 508, a determination is made regarding whether a next image has been received from the infrared camera. If the next image has been received, then the methodology returns to 504. Accordingly, a sequence of depth images can be generated such that movement of the object in three-dimensions can be monitored over time. Thus, if the object is a human hand, a gesture made by the hand can be recognized. If there are no more images received from the infrared camera, then the methodology ends at 510.

Now referring to FIG. 6, an exemplary methodology 600 that facilitates rendering graphical data on a display screen of a computing device based at least in part upon a recognized gesture relative to a graphical object on the display screen is illustrated. The methodology 600 starts at 602, and at 604 a sequence of infrared images of a human hand that is irradiated by an infrared light source is received from an infrared camera. At 606, depths of points of the human hand relative to the infrared light source are computed over the sequence of images. In other words, a sequence of depth images is computed. As discussed above, depth images in the sequence of depth images are computed based at least in part upon the principle of light falloff.

At 608, a determination is made regarding whether a gesture made by the human hand is recognized based upon an analysis of the sequence of depth images. If a gesture is not recognized, then the methodology returns to 604. If at 608 it is determined that the human hand has performed a particular gesture, then at 610 graphical data is rendered on a display screen of a computing device based at least in part upon the recognized gesture. The methodology 600 completes at 612.

With reference collectively to FIGS. 7-21, various exemplary gestures that can be recognized by the gesture recognizer component 216 based upon depth images computed by the depth calculator component 112 are illustrated and described. Also shown are numerous sequences of graphical user interfaces that correspond to such gestures. It is to be understood that these are set forth for purposes of explanation, and are but a relatively small number of gestures that can be recognized by the gesture recognizer component 216.

Figure 7:
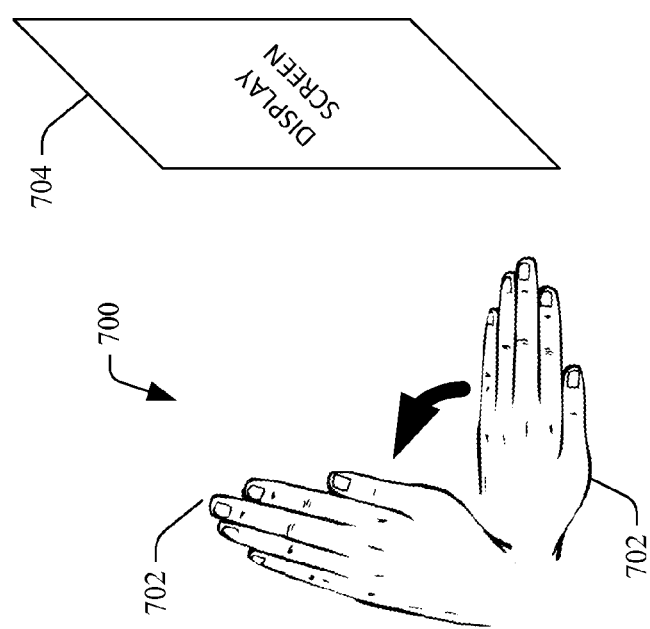
FIG. 7 illustrates an exemplary gesture undertaken relative to one or more graphical objects on a display screen of a computing device.

Now referring solely to FIG. 7, an exemplary gesture 700 that can be undertaken by a user relative to a graphical object shown on a display screen of a computing device is illustrated. A hand 702 of the user is initially positioned with fingers extended orthogonal to the surface of a display screen 704, with the palm of the hand being generally parallel with a bottom edge of the display screen 704. The hand 702 is then pivoted upwardly about a wrist of a user, such that the extended fingers of the hand move towards being parallel with the surface of the display screen 704. Such upward waving motion can be made relative to a graphical object displayed on a display screen 704. As described above, this gesture can be recognized by the gesture recognizer component 216 based upon depth images compute by the depth calculator component 112.

Figure 8:
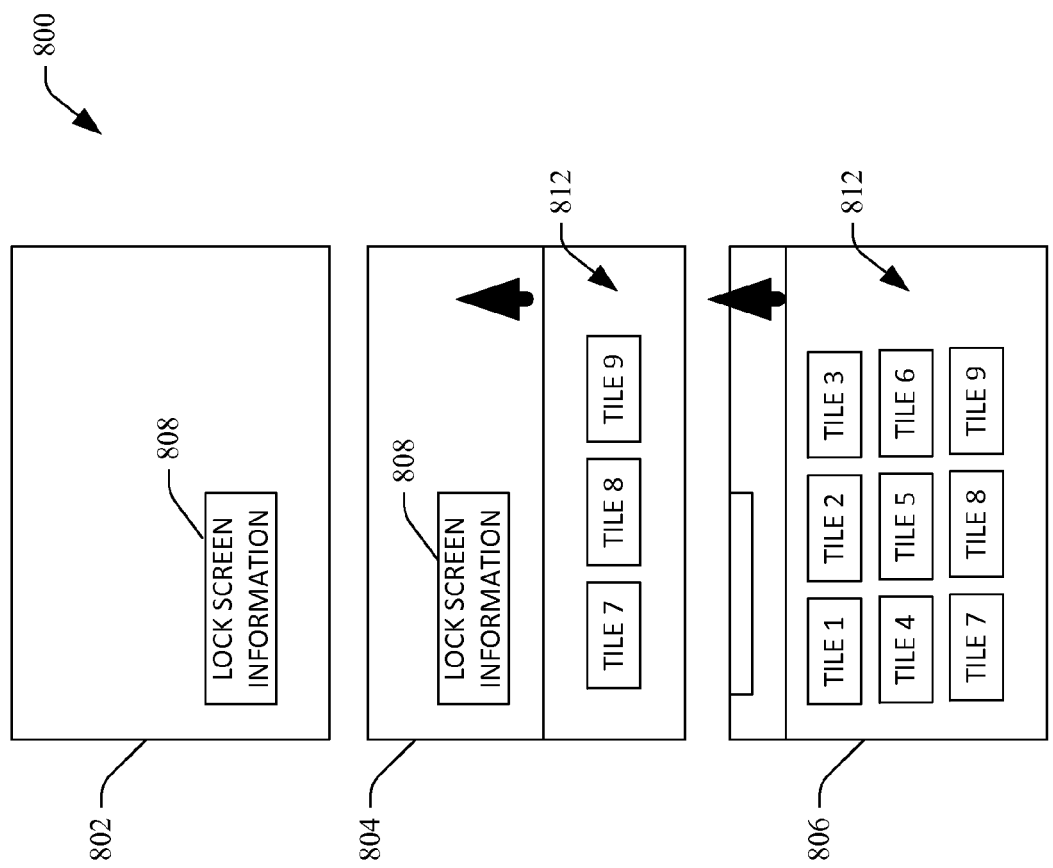
FIG. 8 illustrates a sequence of graphical user interfaces presented to a user in connection with the exemplary gesture shown in FIG. 7.

With reference to FIG. 8, a sequence 800 of graphical user interfaces 802-806 that correspond to the gesture 700 is depicted. The graphical user interfaces 802-806 are presented on the display screen 704. The graphical user interface 802 depicts a lock screen that can be presented to the user prior to the user performing the gesture 700, wherein the lock screen includes lock screen information 808. The lock screen information 808 may include, for example, instructions as to one or more gestures that can be performed by the user to unlock the computing device, a current time, graphical data that indicates whether the user has any form of receive communication to be reviewed (e-mails, instant messages, text messages, etc.), amongst other information.

The graphical user interface 804 illustrates a graphical transition that can be presented to the user responsive to the gesture 700 being recognized by the gesture recognizer component 216. Here, the lock screen appears to transition upward off of the display screen 704, analogous to a curtain being lifted. The direction of the transition is shown by the arrow 810. As the lock screen transitions upwardly, a home screen that includes a plurality of selectable tiles 812 is revealed, wherein the selectable tiles can correspond to particular data objects, computer executable applications, or the like (as will be understood by one skilled in the art). The rate of transition of the lock screen, in an exemplary embodiment, can be based upon the speed at which the hand 702 is pivoted about the wrist. The graphical user interface 806 shows continued transition of the lock screen upwardly and off the display screen 704, such that more of the home screen is presented on the display screen 704. Such visual transition can continue until an entirety of the home screen is displayed to the user on the display screen 704.

Figure 9:
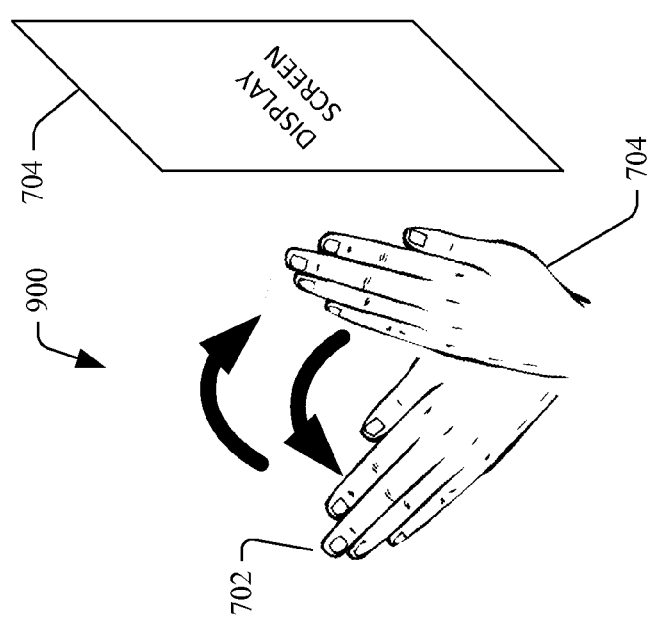
FIG. 9 illustrates another exemplary gesture undertaken relative to one or more graphical objects displayed on a display screen of a computing device.

Now referring to FIG. 9, another exemplary gesture 900 that can be undertaken by a user relative to a graphical object shown on a display screen of a computing device is illustrated. The hand 702 is initially oriented such that the fingers of the hand 702 are extended upwardly, such that the palm of the hand is parallel with the surface of the display screen 704. The hand 702 is then pivoted either leftwardly or rightwardly about the wrist, such that the user is waving at the display screen 704.

Figure 10:
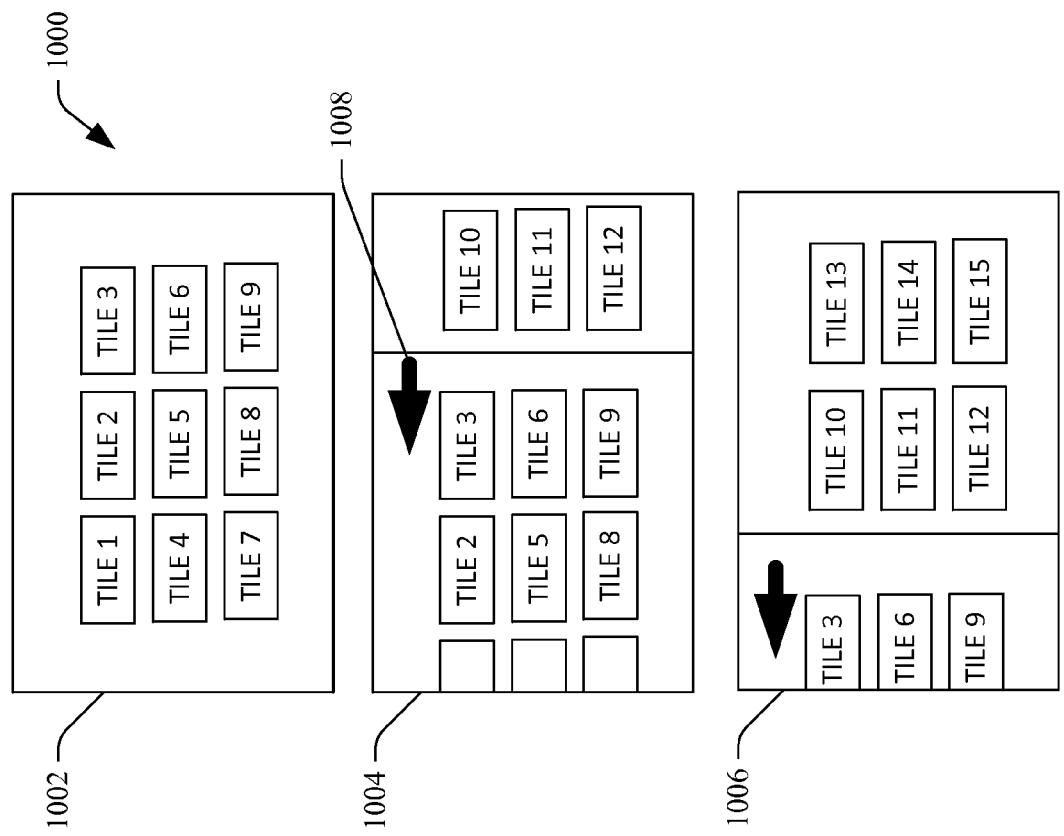
FIG. 10 illustrates a sequence of graphical user interfaces presented to a user in connection with the exemplary gesture shown in FIG. 9.

Referring to FIG. 10, a sequence 1000 of graphical user interfaces 1002-1006 that correspond to the gesture 900 is depicted. Prior to the gesture 900 being performed by the user, the graphical user interface 1002 is presented on the display screen 704, wherein the graphical user interface 1002 represents the home screen, and includes the plurality of selectable tiles 812. As the gesture 900 is performed (e.g., the hand 702 pivoted leftwardly about the wrist) the home screen is transitioned leftwardly off of the display screen 704, and a second screen is transitioned from the right side of the display screen 704 leftwardly. A beginning of such transition is shown in the graphical user interface 1004, with the direction of transition shown by arrow 1008. As shown in the graphical user interface 1006, the second screen continues to transition onto the display screen 704 from the right side (analogous to sliding a paper into a field of view), while the home screen continues to transition leftwardly off of the display screen 704. It can be ascertained that the direction of transition between graphical user interfaces can depend upon the direction that the hand is pivoted about the wrist. Moreover, speed of transition between screens can be based upon rotational velocity of the pivoting of the hand 702 of the user about the wrist.

Figure 11:
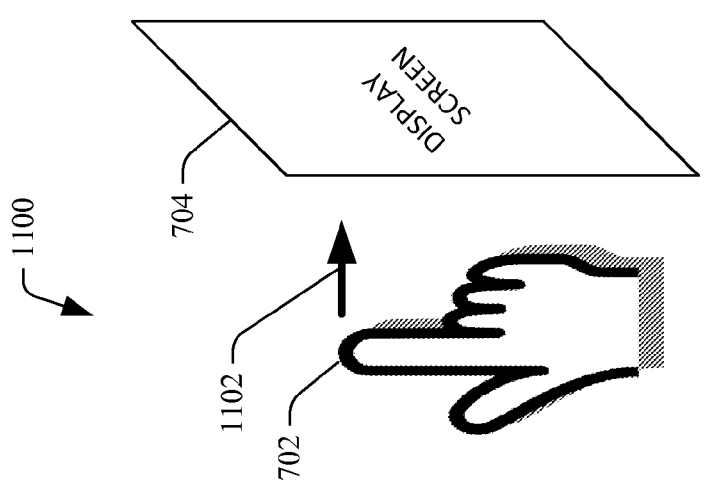
FIG. 11 illustrates yet another exemplary gesture undertaken relative to one or more graphical objects displayed on a display screen of a computing device.

Now referring to FIG. 11, yet another exemplary gesture 1100 that can be undertaken by a user relative to a graphical object shown on a display screen of a computing device is illustrated. In the exemplary gesture 1100, the palm of the hand 702 is approximately parallel to the surface of the display screen 704, and only the pointer finger is extended therefrom (approximately parallel to the surface of the display screen 704). The pointer finger of the hand 702 is then transitioned towards the display screen 704, as shown by the arrow 1102. Thus, the gesture 1100 is a tapping motion made with the pointer finger of the hand 702.

Figure 12:
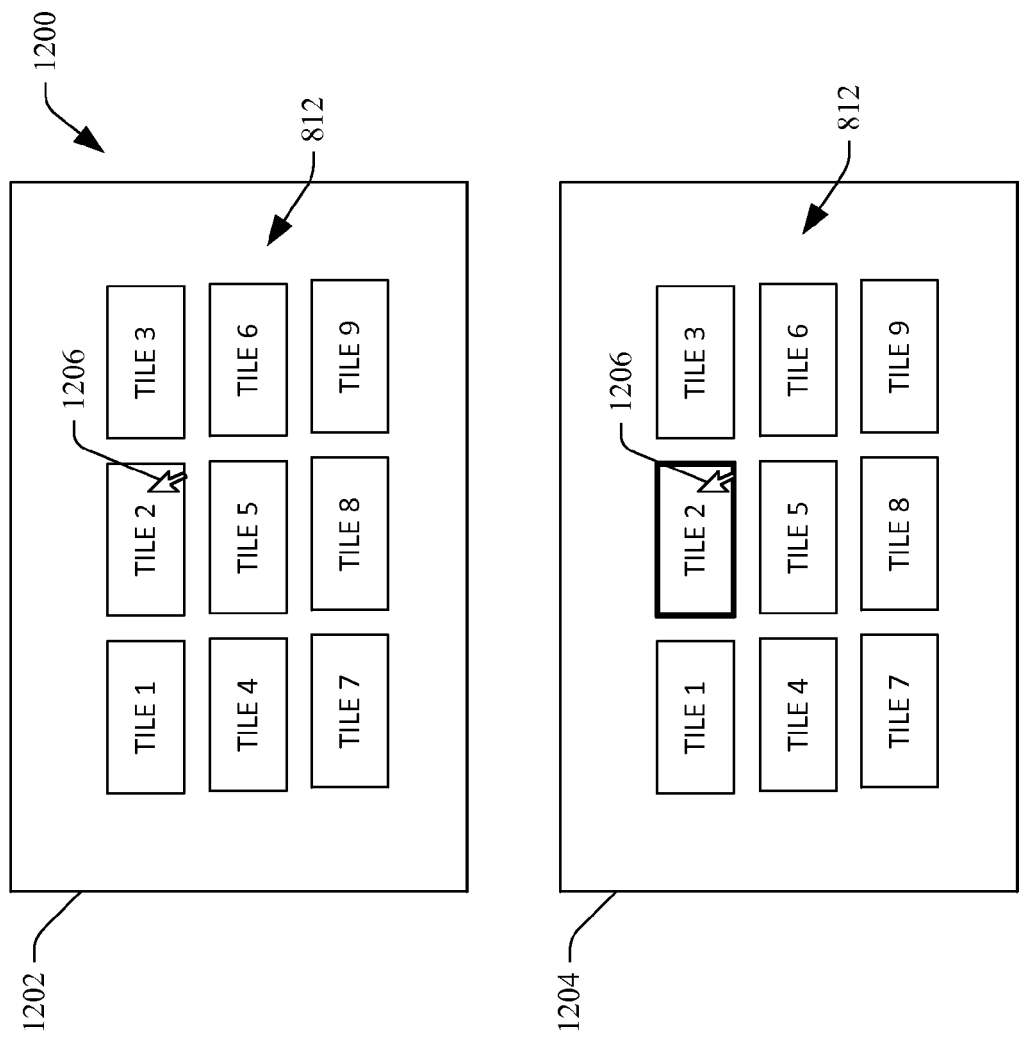
FIG. 12 illustrates a sequence of graphical user interfaces presented to a user in connection with the exemplary gesture shown in FIG. 11.

With reference now to FIG. 12, a sequence 1200 of graphical user interfaces 1202-1204 that correspond to the gesture 1100 is depicted. The graphical user interface 1202 depicts the home screen, with the plurality of selectable tiles 812. The graphical user interface 1202 also includes graphical indicia 1206 that informs the user as to the location of the pointer finger of the hand 702 relative to one or more of the selectable tiles in the plurality of selectable tiles 812. In the example shown in the graphical user interface 1202, the pointer finger of the hand 702 is positioned relative to the display screen 704 such that if the pointer finger of the hand 702 is transitioned towards the display screen 704, the second selectable tile from amongst the plurality of tiles 812 will be selected.

The graphical user interface 1204 illustrates that visual feedback is presented to the user responsive to the user performing the gesture 1100. As depicted, the user has selected the second tile from amongst the plurality of selectable tiles 812 through performing the gesture.

Figure 13:
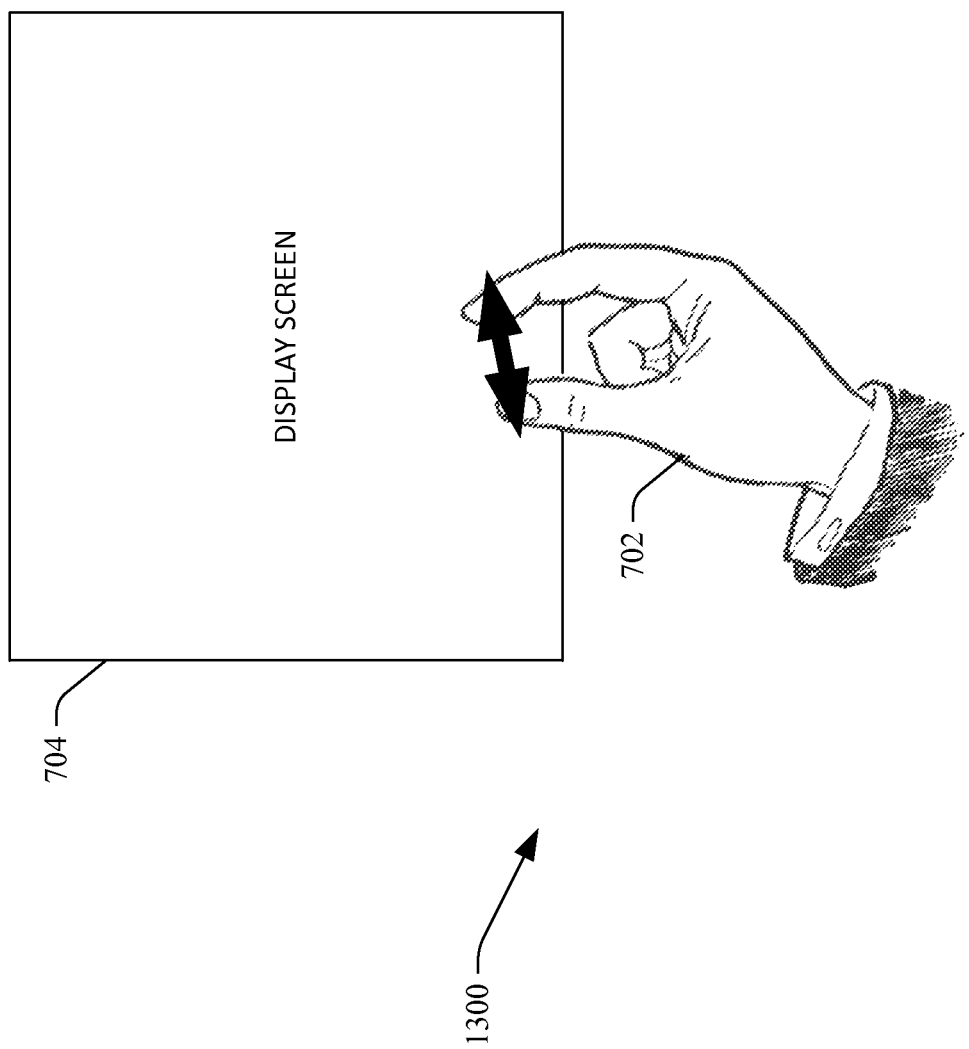
FIG. 13 illustrates still yet another exemplary gesture undertaken relative to one or more graphical objects displayed on a display screen of a computing device.

With reference now to FIG. 13, still yet another exemplary gesture 1300 that can be undertaken by a user relative to a graphical object shown on a display screen of a computing device is illustrated. In the exemplary gesture 1300, the palm of the hand 702 is approximately parallel to a bottom edge of the display screen 704 and is perpendicular to a surface of the display screen 704. The thumb and pointer finger of the hand 702 are moved relative to one another, together and apart, to make a pinching gesture. In a gaming environment, for example, the pinching gesture can be recognized by the gesture recognizer component 116 and a particular graphical object on the display screen 704 can be "grabbed". For instance, in a game that requires a slingshot motion, the user can make a pinching gesture with the hand 702. By transitioning the hand 702 away from the display screen 704 (with the thumb and pointer finger in a pinching position), bands of the slingshot are pulled. Separating the thumb and forefinger can cause the slingshot to release a projectile towards a target depicted on the display screen 704.

Now referring to FIG. 14, another exemplary gesture 1400 that can be undertaken by a user relative to a graphical object shown on a display screen of a computing device is illustrated. In the gesture 1400, the hand 702 of a user is initially in an open position with a palm of the hand 702 being parallel to the display screen an 704 and facing the display screen 704. Additionally, the fingers of the hand extend from the palm and are parallel with the sides of the display screen 704. In the gesture 1400, the hand 702 is then closed to create a first (as if the user is grabbing an object).

Referring now to FIG. 15, a sequence 1500 of graphical user interfaces 1502-1504 that correspond to the gesture 1400 is depicted. Prior to the gesture 1400 being performed and recognized, the graphical user interface 1502 is presented on the display screen 704, wherein the graphical user interface 1502 is for an application. The user performs the gesture 1400 to perform some task relative to the application, such as minimizing or closing the application. The graphical user interface 1504 corresponds to the gesture recognizer component 216 recognizing the gesture 1400, such that a toolbar 1506 for the application is shown in the graphical user interface 1504.

Figure 16:
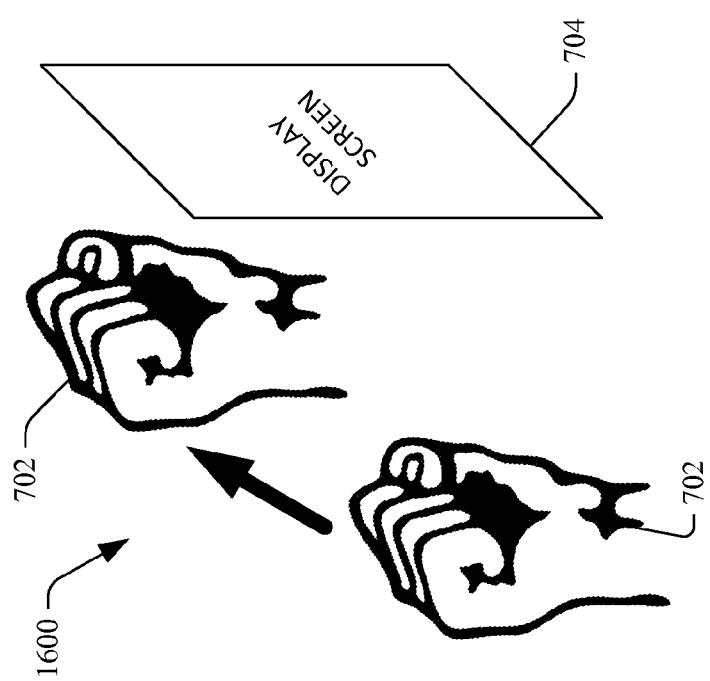
FIG. 16 illustrates yet another exemplary gesture undertaken relative to one or more graphical objects displayed on a display screen of a computing device.

With reference now to FIG. 16, another exemplary gesture 1600 that can be undertaken by a user relative to a graphical object shown on a display screen of a computing device is illustrated. In the exemplary gesture 1600, the hand 702 is in a fist, with a palm thereof being parallel to the surface of the display screen 704. Subsequently, the hand 702 is transitioned, remaining in the form of the fist, in a direction that remains approximately parallel to the surface of the display screen 704.

Figure 17:
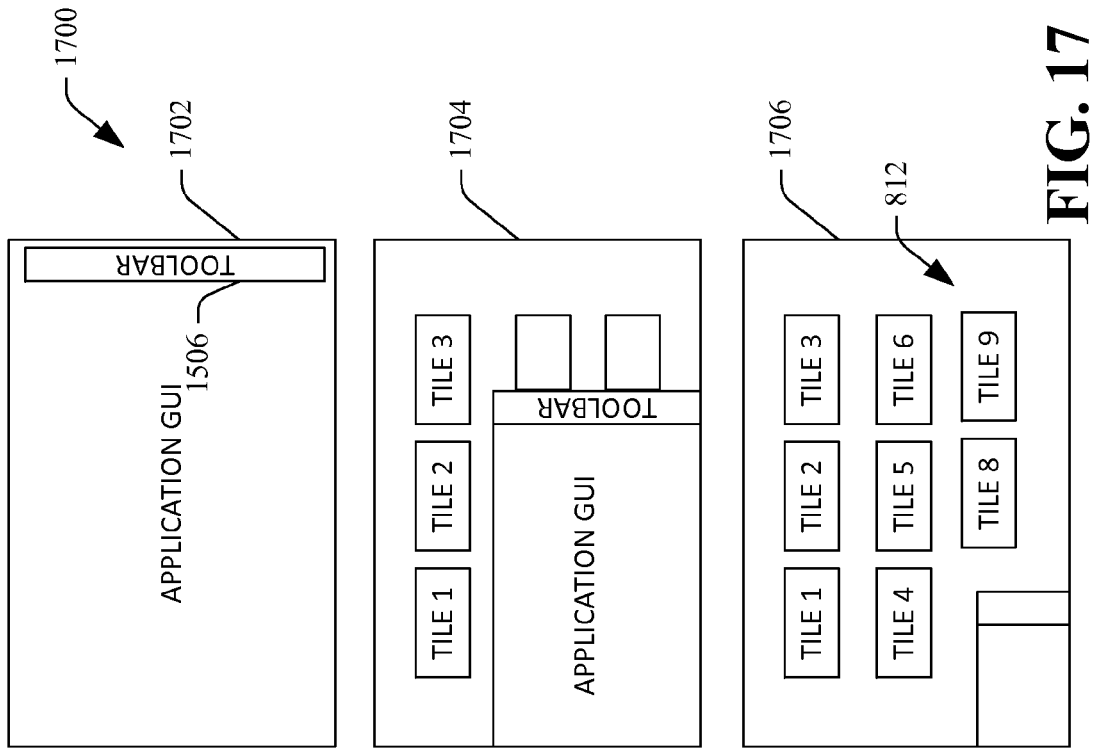
FIG. 17 illustrates a sequence of graphical user interfaces presented to a user in connection with the exemplary gesture shown in FIG. 16.

With reference to FIG. 17, a sequence 1700 of graphical user interfaces 1702-1706 that correspond to the gesture 1600 is depicted. The graphical user interface 1702 shows the toolbar being presented when the user has performed the gesture 1400 shown in FIG. 14. By transitioning the hand 702 a particular amount relative to the to the display screen 704 (and optionally at a particular velocity) with the hand 702 remains in the form of a fist, the user can indicate that she wishes to exit/minimize the application shown on the display screen 704. The graphical user interface 1704 shows the application being transitioned out of the display screen 704 (in a direction that corresponds to the direction of movement of the fist), thereby presenting the home screen that includes the plurality of selectable tiles 812. The graphical user interface 1706 shows the continued transition of the application graphical user interface from the display screen 704.

Figure 18:
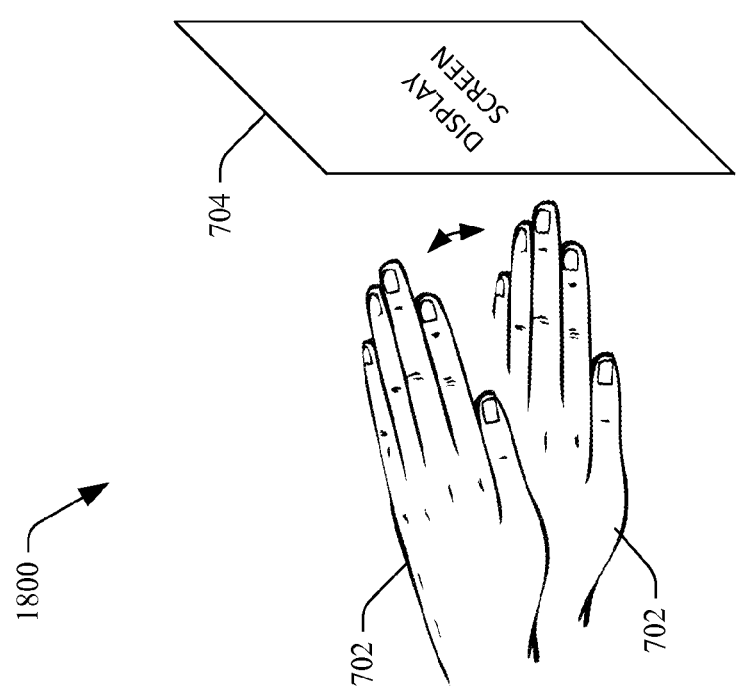
FIG. 18 illustrates still yet another exemplary gesture undertaken relative to one or more graphical objects displayed on a display screen of a computing device.

With reference now to FIG. 18, another exemplary gesture 1800 that can be undertaken by a user relative to a graphical object shown on a display screen of a computing device is illustrated. In the exemplary gesture 1800, the hand 702 of the user is initially configured such that the fingers of the hand extend orthogonal to the surface of the display screen 704, and the palm is parallel to the bottom edge of the display screen 704, facing downwardly. The hand 702 is then pivoted about the wrist of the user either leftwardly or rightwardly. This gesture 1800 can be employed to select, for instance, a data collection from amongst a plurality of selectable data collections.

Figure 19:
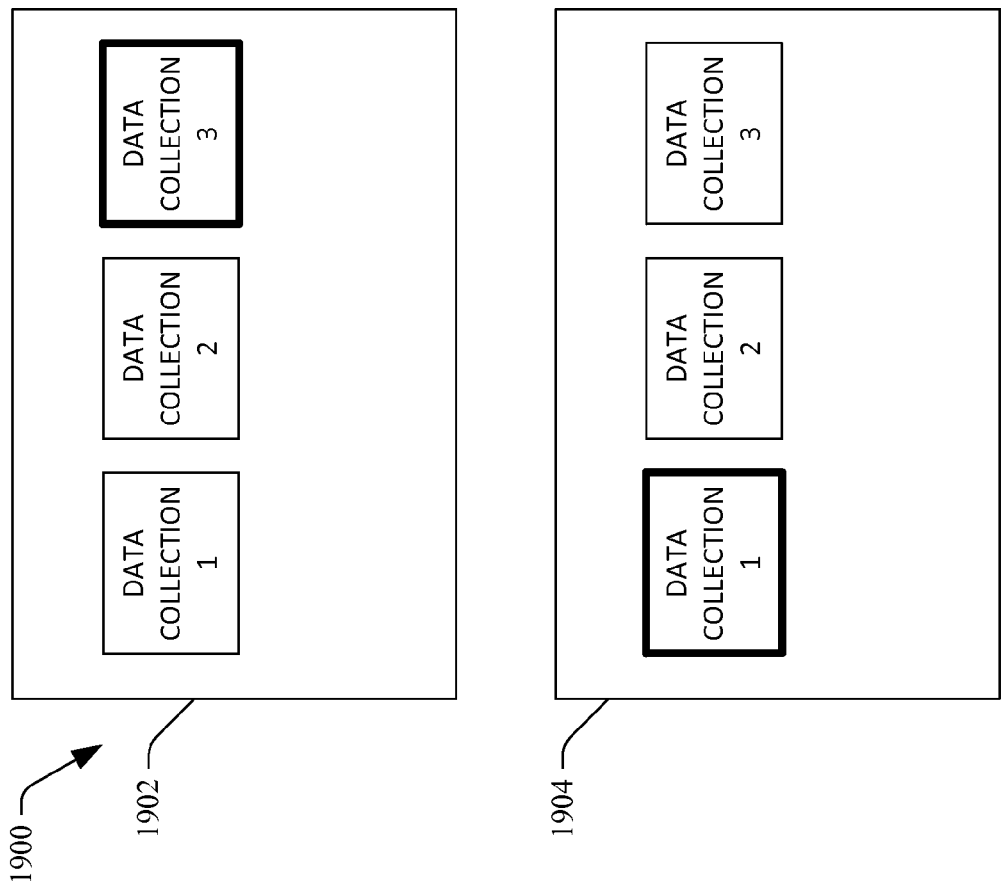
FIG. 19 illustrates a sequence of graphical user interfaces presented to a user in connection with the exemplary gesture shown in FIG. 18.

Now referring to FIG. 19, a sequence 1900 of graphical user interfaces 1902-1904 that correspond to the gesture 1800 is depicted. The graphical user interface 1902 includes a plurality of graphical objects that are representative of respective data collections. For example, such data collections can be file folders that include word processing files or other documents. In another example, the data collections may be a collection of pictures, videos, or the like.

In the graphical user interface 1902, it can be ascertained that a position of the hand 702 of the user relative to the display screen 704 has caused the third data collection to be initially selected. This is represented in the graphical user-interface 1902 by the third data collection being shown in bold. The graphical user interface 1904 illustrates a change in selection of a data collection based upon recognition of the gesture 1800 made by the hand 702 of the user. For instance, the user may have pivoted the hand 702 leftwardly about the wrist to alter the selection from the third data collection to the first data collection. Selection of the first data collection is shown in the graphical user interface 1904 by the first data collection being set forth in bold.

Figure 20:
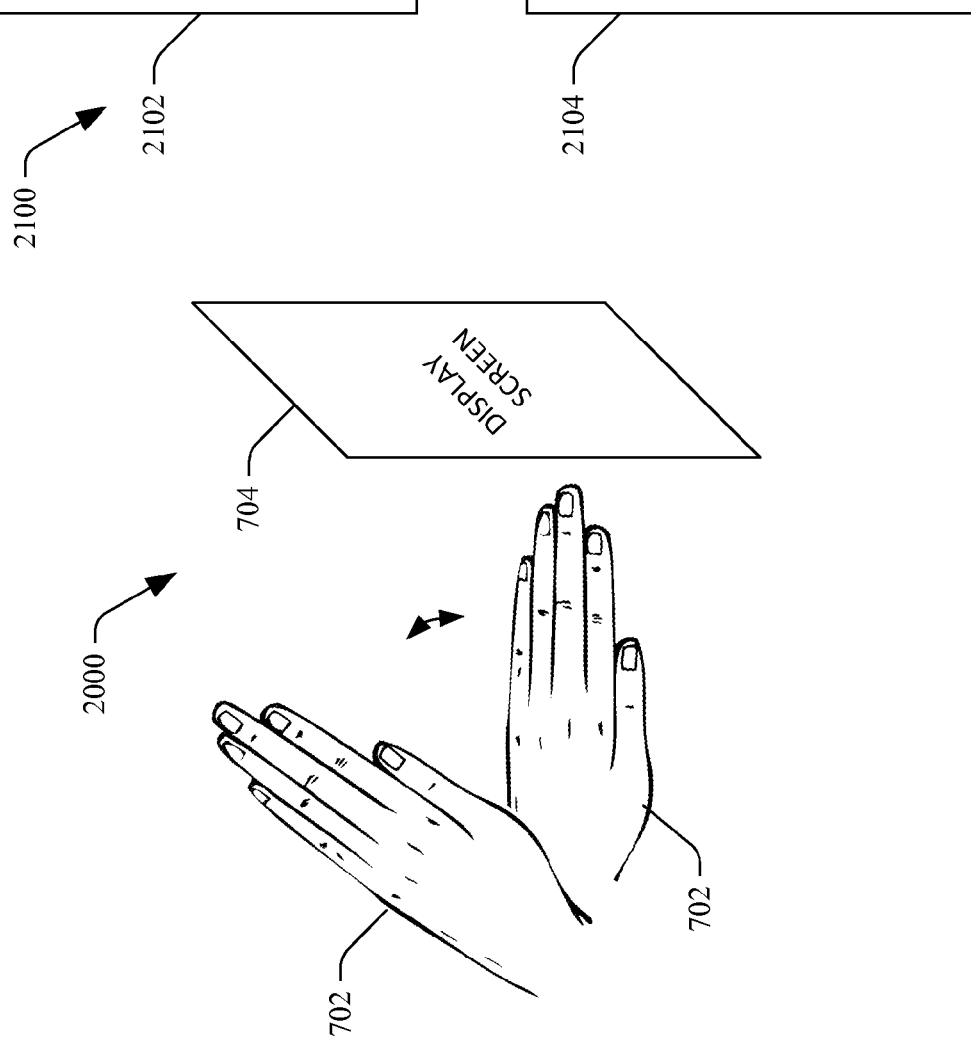
FIG. 20 illustrates another exemplary gesture undertaken relative to one or more graphical objects displayed on a display screen of a computing device.

Turning now to FIG. 20, yet another exemplary gesture 2000 that can be undertaken by a user relative to a graphical object shown on a display screen of a computing device is illustrated. The gesture 2000 is similar to the gesture 700 shown in FIG. 7; however, the gesture 2000 is undertaken relative to a different graphical object (in a different context). The hand 702 is initially positioned such that the palm of the hand 702 is parallel to the bottom of the display screen 704 facing downwardly, and the fingers of the hand 702 extend from the palm orthogonal to the surface of the display screen 704. The hand 702 is then pivoted upwardly about the wrist.

Figure 21:
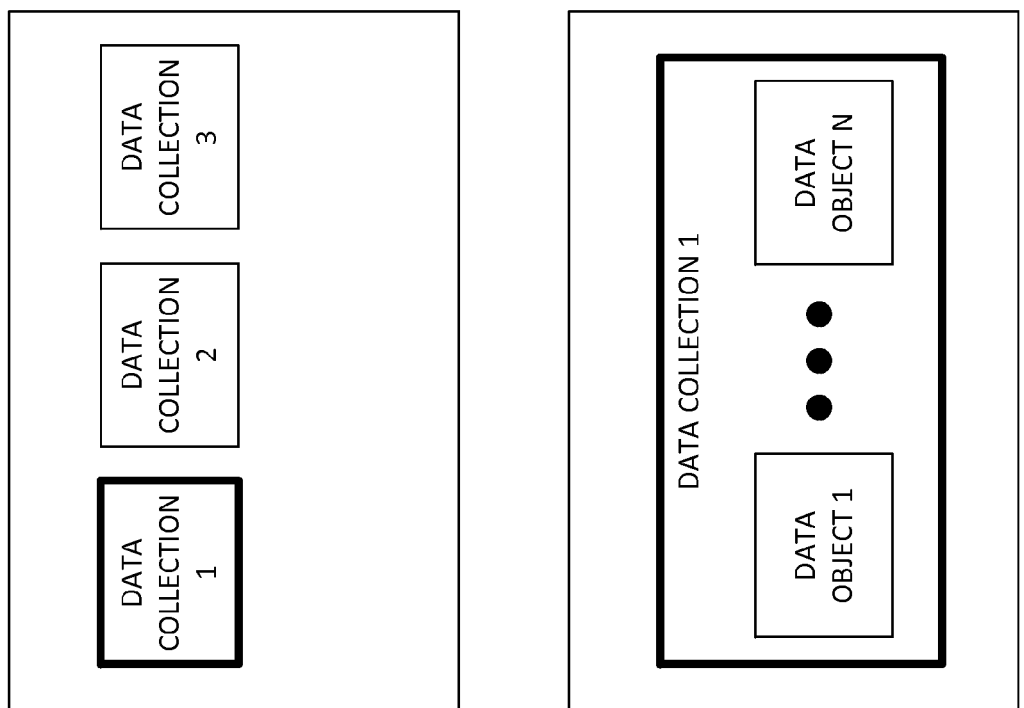
FIG. 21 illustrates a sequence of graphical user interfaces presented to a user in connection with the exemplary gesture shown in FIG. 20.

Referring now to FIG. 21, a sequence 2100 of graphical user interfaces 2102-2104 that correspond to the gesture 2000 is depicted. As shown in the graphical user interface 2102, the first data collection has been selected by the user via the gesture 1800 shown in FIG. 18. Responsive to the gesture 2000 being recognized (after the first data collection has been selected), the graphical user interface 2104 is presented to the user, wherein the graphical user interface 2104 shows that the first data collection has been expanded to depict individual data objects to the user. For instance, if the first data collection comprises a plurality of images that correspond to a particular event, the user can make the gesture 2000 relative to the display screen 704, and individual images in the data collection can be presented to the user. Thereafter, for instance, the user can employ the gesture 1100 shown in FIG. 11 to select a particular one of the images.

As noted above, FIGS. 7-21 have been presented herein to illustrate a relatively small subset of gestures that can be recognized based upon the three-dimensional depth sensing that has been described above. Numerous other gestures are contemplated. For instance, multi-hand gestures are contemplated, wherein the user can extend both pointer fingers of her left and right hand, select a graphical object, and cause the graphical object to expand or reduce in size based upon positions of the pointer fingers relative to one another. For example, moving the pointer fingers of the hands apart will cause the graphical object to be enlarged, while moving the pointer fingers of the hands closer together will cause size of the graphical object to be reduced.

Figure 22:
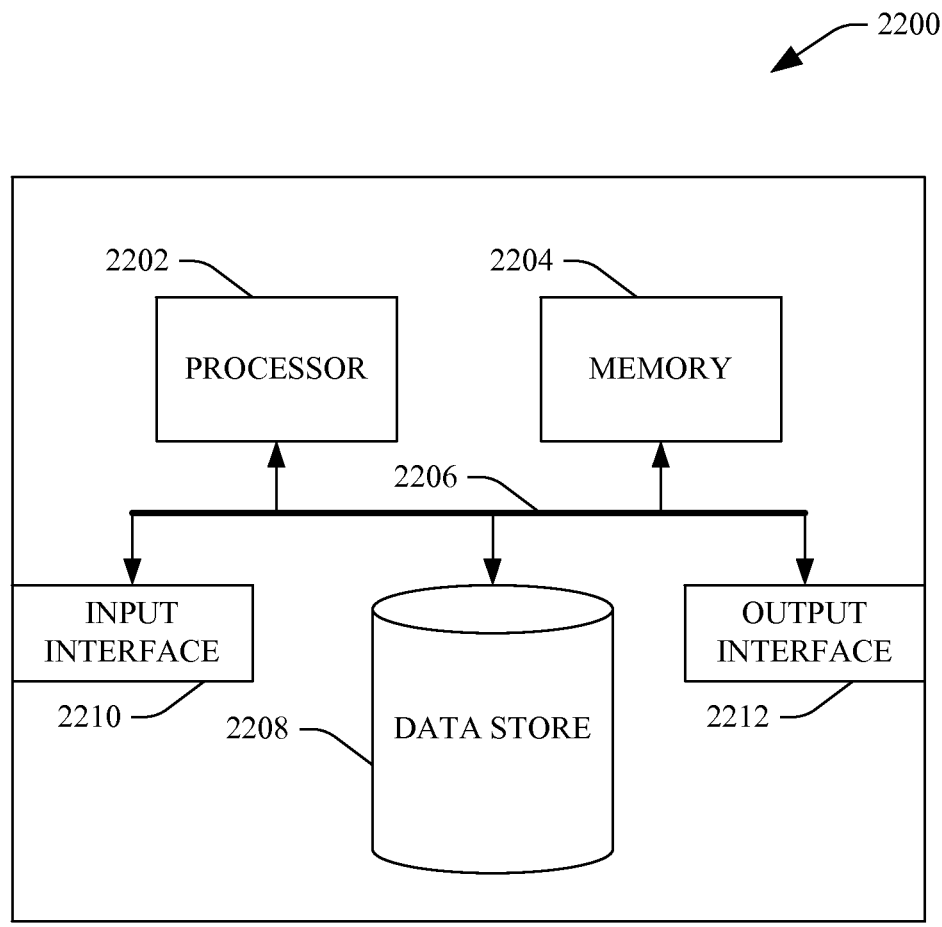
FIG. 22 is an exemplary computing system.

Now referring to FIG. 22, a high-level illustration of an exemplary computing device 2200 that can be used in accordance with the systems and methodologies disclosed herein is illustrated. For instance, the computing device 220 may be used in a system that supports computing depth images of a scene based upon the principle of light falloff. In another example, at least a portion of the computing device 2200 may be used in a system that supports recognizing gestures made in three-dimensional space. The computing device 2200 includes at least one processor 2202 that executes instructions that are stored in a memory 2204. The memory 2204 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 2202 may access the memory 2204 by way of a system bus 2206. In addition to storing executable instructions, the memory 2204 may also store depth images, infrared images, RGB images, calibration parameters, etc.

The computing device 2200 additionally includes a data store 2208 that is accessible by the processor 2202 by way of the system bus 2206. The data store may be or include any suitable computer-readable storage, including a hard disk, memory, etc. The data store 2208 may include executable instructions, infrared images, RGB images, depth images, calibration parameters, etc. The computing device 2200 also includes an input interface 2210 that allows external devices to communicate with the computing device 2200. For instance, the input interface 2210 may be used to receive instructions from an external computer device, from a user, etc. The computing device 2200 also includes an output interface 2212 that interfaces the computing device 2200 with one or more external devices. For example, the computing device 2200 may display text, images, etc. by way of the output interface 2212.

Additionally, while illustrated as a single system, it is to be understood that the computing device 2200 may be a distributed system. Thus, for instance, several devices may be in communication by way of a network connection and may collectively perform tasks described as being performed by the computing device 2200.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system comprising:
   at least one processor; and
   memory storing instructions that, when executed by the at least one processor, cause the at least one processor to perform acts comprising:
   receiving an infrared image of a scene irradiated by an infrared emitter, the infrared image captured by an infrared camera, the infrared image comprises pixels, each pixel in the pixels having an intensity value assigned thereto;
   generating a depth image of the scene based upon the infrared image of the scene, wherein the depth image comprises depth pixels, each depth pixel having a depth value assigned thereto that is indicative of a distance between the infrared emitter and a respective object in the scene, wherein generating the depth image of the scene comprises applying the principle of light falloff with respect to intensity values of the pixels of the infrared image to compute the depth values of the depth image, and further wherein when the principle of light falloff is applied to an intensity value of a pixel in the infrared image, a depth value of a corresponding depth pixel in the depth image is computed by the at least one processor based upon a square root of the intensity value of the pixel in the infrared image; and
   rendering graphical data on a display based upon the depth image.

2. The system of claim 1 comprised by a mobile computing device.

3. The system of claim 1, further comprising a housing, the housing comprising the at least one processor, the memory, the infrared camera, and the infrared emitter.

4. The system of claim 1, wherein when the principle of light falloff is applied to the pixel in the infrared image, the at least one processor computes the depth value of the corresponding depth pixel in the depth image further based upon a constant.

5. The system of claim 1, wherein generating the depth image further comprises:
   generating the depth image based upon a first image captured by a first RGB camera; and
   a second image captured by a second RGB camera, wherein the first RGB camera and the second RGB camera are stereoscopically arranged.

6. The system of claim 5, the acts further comprising:
   calibrating depth images that have been generated based upon binocular vision technologies; and
   calibrating depth images that have been generated based upon images captured by the infrared camera to learn calibration parameters, the calibration parameters are indicative of a mapping between:
   pixels of depth images that have been generated based upon binocular vision technologies; and
   pixels of depth images that have been generated based upon images captured by the infrared camera.

7. The system of claim 6, wherein generating the depth image further comprises:
   generating an initial depth image of the scene based upon the first image captured by the first RGB camera and the second image captured by the second RGB camera; and
   generating the depth image based upon the initial depth image.

8. The system of claim 7, wherein generating the depth image further comprises:
   segmenting the initial depth image into a plurality of segments, each segment comprising pixels in the initial depth image with depth values falling into a respective range;
   mapping the plurality of segments to respective portions of the infrared image based upon the calibration parameters; and
   generating the depth image based upon mapping of the plurality of segments to the respective portions of the infrared image.

9. The system of claim 8, the initial depth image has a first resolution, the depth image has a second resolution, and the second resolution is higher than the first resolution.

10. The system of claim 1, wherein the scene, when captured in the infrared image, comprises a human hand, the acts further comprising:
    recognizing a gesture being made by the human hand relative to a graphical object being displayed on the display, wherein the gesture is recognized based upon the depth image; and
    rendering the graphical data on the display screen of the computing device based upon the gesture.

11. The system of claim 10, the graphical object is a lock screen, the gesture is an upward pivoting of the human hand about a wrist, and the graphical data is a visual transition to a home screen, the home screen comprising a plurality of selectable tiles for a respective plurality of executable applications.

12. The system of claim 10, the graphical object is a graphical user interface that comprises a first plurality of selectable tiles for a first plurality of applications that are executable by a processor, the gesture is a leftwardly or rightwardly pivoting of the human hand about a wrist, and the graphical data is a visual transition to another graphical user interface that comprises a second plurality of selectable tiles for a respective second plurality of applications that are executable by the processor, wherein a direction of the visual transition is one of leftward or rightward and corresponds to a direction of the pivoting of the human hand.

13. The system of claim 10, the graphical object is a graphical user interface that comprises a plurality of selectable tiles for a respective plurality of applications that are executable by a processor, the gesture comprises an extension of a pointer finger of the human hand and transitioning of the pointer finger toward the display, and the graphical data is a visual indicator that a particular tile from amongst the plurality of selectable tiles has been selected.

14. A method executed by at least one computer processor, the method comprising:

receiving, from an infrared camera, a sequence of infrared images of a scene that comprises a mobile object, the scene irradiated with infrared light by an infrared emitter, wherein each infrared image in the sequence of infrared images comprises a plurality of pixels, each pixel in each infrared image in the sequence of infrared images having an intensity value assigned thereto;

generating a sequence of depth images of the scene based upon the sequence of infrared images of the scene, wherein each depth image in the sequence of depth images comprises a plurality of depth pixels, each depth pixel in each depth image in the sequence of depth images having depth values assigned thereto, wherein a subset of the depth values are indicative of a distance between the mobile object and the infrared emitter, wherein generating the sequence of depth images based upon the sequence of infrared images comprises:

for an infrared image in the sequence of infrared images, determining, based upon application of the principle of light falloff to intensity values of pixels of the infrared image, depth values for corresponding depth pixels in a depth image, wherein when the at least one computer processor applies the principle of light falloff to an intensity value of a pixel in the infrared image, the at least one computer processor computes a depth value of a corresponding depth pixel in the depth image based upon a square root of the intensity value of the pixel in the infrared image; and rendering graphical data on a display based upon the subset of depth values in the depth images that are indicative of the distance between the mobile object and the infrared image.

15. The method of claim 14, wherein the mobile object is a human hand, the method further comprising:

recognizing a gesture being made by the human hand relative to a graphical object on the display based upon the subset of depth values; and rendering the graphical data on the display based upon the gesture being made by the human hand.

16. The method of claim 15, the gesture being one of an upwardly pivoting of the human hand about a wrist, a leftwardly pivoting of the human hand about the wrist, a rightwardly pivoting of the human hand about the wrist, or an extension of a pointer finger from the human hand.

17. The method of claim 16, wherein a portion of the human hand that is most proximate to the display is between one centimeter and eight centimeters from the display.

18. The method of claim 14, wherein when the at least one processor applies the principle of light falloff to the intensity value of the pixel in the infrared image, the at least one processor computes the depth value of the corresponding depth pixel in the depth image further based upon an intensity of the infrared light emitted from the emitter when irradiating the scene.

19. The method of claim 14 executed by a processor in a mobile telephone.

20. A computer-readable medium comprising instructions that, when executed by a processor, cause the processor to perform acts comprising:

receiving an infrared image of a scene from an infrared camera, the scene irradiated with infrared light by an infrared emitter, the scene comprises a human hand, the infrared image comprising a plurality pixels, each pixel in the plurality of pixels has an intensity value;

generating a depth image based upon the intensity values of the pixels of the infrared image, the depth image comprises depth pixels that have depth values, wherein generating the depth image comprises applying the principle of light falloff to the intensity values of the pixels of the infrared image, and further wherein when the principle of light falloff is applied to an intensity value of a pixel of the infrared image, a depth value for a depth pixel in the depth image that corresponds to the pixel of the infrared image is determined based upon a square root of the intensity value of the pixel of the depth image, and further wherein the depth value is indicative of a distance between the human hand the infrared emitter;

recognizing a gesture being performed by the human hand relative to a graphical object being displayed on a display based upon the depth image; and rendering graphical data on the display based upon the gesture recognized as being performed by the human hand.

\* \* \* \* \*